US010055428B2

(12) United States Patent
Gallo et al.

(10) Patent No.: US 10,055,428 B2
(45) Date of Patent: Aug. 21, 2018

(54) SPATIALLY DRIVEN CONTENT PRESENTATION IN A CELLULAR ENVIRONMENT

(71) Applicant: Open Text SA ULC, Halifax (CA)

(72) Inventors: Anthony Carmen Gallo, Toronto (CA); Jimmy Talbot, Toronto (CA)

(73) Assignee: Open Text SA ULC, Halifax, CA (US)

( * ) Notice: Subject to any disclaimer, the term of this patent is extended or adjusted under 35 U.S.C. 154(b) by 854 days.

(21) Appl. No.: 14/314,585

(22) Filed: Jun. 25, 2014

(65) Prior Publication Data

US 2014/0310308 A1     Oct. 16, 2014

Related U.S. Application Data

(63) Continuation of application No. 13/787,403, filed on Mar. 6, 2013, now Pat. No. 8,793,604, which is a (Continued)

(51) Int. Cl.
  *G06F 3/00* (2006.01)
  *G06F 3/048* (2013.01)
  (Continued)

(52) U.S. Cl.
  CPC ...... *G06F 17/30277* (2013.01); *G06F 3/0481* (2013.01); *G06F 3/0482* (2013.01); (Continued)

(58) Field of Classification Search
  None
  See application file for complete search history.

(56) References Cited

U.S. PATENT DOCUMENTS 4,845,645 A   7/1989  Matin et al.
5,043,919 A   8/1991  Callaway et al.
    (Continued)

FOREIGN PATENT DOCUMENTS

DE   19523483 A1   1/1997
EP    0428135 A2   5/1991
    (Continued)

OTHER PUBLICATIONS

Notice of Allowance for U.S. Appl. No. 13/174,543, dated Nov. 13, 2015, 6 pgs.
    (Continued)

*Primary Examiner* — Yongjia Pan
(74) *Attorney, Agent, or Firm* — Sprinkle IP Law Group

(57) ABSTRACT

Techniques are provided for integrated content presentation via cells arranged geometrically in a cellular environment. Users can navigate various orientations and zoom states of the cellular environment to access information via different applications, different media types, different visual representations and from different underlying content sources. The information can be organized according to various logical relationships. Upon receiving an indication of a zoom state associated with a cell or a group of cells arranged in the cellular environment, a content reference at that zoom state is retrieved. Further, the content reference is resolved to retrieve and output content, including a visual representation associated with the zoom state.

20 Claims, 17 Drawing Sheets

Related U.S. Application Data continuation of application No. 11/281,924, filed on Nov. 16, 2005, now Pat. No. 8,418,075.

(60) Provisional application No. 60/628,939, filed on Nov. 16, 2004.

(51) Int. Cl.
| | | |
|---|---|---|
| *G06F 17/30* | (2006.01) | |
| *G06F 3/0481* | (2013.01) | |
| *G06F 17/24* | (2006.01) | |
| *G06F 3/0482* | (2013.01) | |
| *G06F 3/0483* | (2013.01) | |
| *G06F 3/0484* | (2013.01) | |

(52) U.S. Cl.
CPC ........ *G06F 3/0483* (2013.01); *G06F 3/04842* (2013.01); *G06F 17/246* (2013.01); *G06F 2203/04806* (2013.01)

(56) References Cited

U.S. PATENT DOCUMENTS

| | | | |
|---|---|---|---|
| 5,060,170 A | 10/1991 | Bourgeois et al. | |
| 5,293,615 A | 3/1994 | Amada | |
| 5,341,466 A | 8/1994 | Perlin et al. | |
| 5,363,482 A | 11/1994 | Victor et al. | |
| 5,491,780 A | 2/1996 | Fyles et al. | |
| 5,500,935 A | 3/1996 | Moran et al. | |
| 5,544,354 A | 8/1996 | May et al. | |
| 5,555,354 A * | 9/1996 | Strasnick | G06F 3/04815 345/427 |
| 5,564,112 A | 10/1996 | Hayes et al. | |
| 5,572,643 A | 11/1996 | Judson | |
| 5,704,050 A | 12/1997 | Redpath | |
| 5,712,995 A | 1/1998 | Cohn | |
| 5,715,453 A | 2/1998 | Stewart | |
| 5,721,853 A | 2/1998 | Smith | |
| 5,764,908 A | 6/1998 | Shoji et al. | |
| 5,764,916 A | 6/1998 | Busey et al. | |
| 5,771,042 A | 6/1998 | Santos-Gomez | |
| 5,774,660 A | 6/1998 | Brendel et al. | |
| 5,781,189 A | 7/1998 | Holleran et al. | |
| 5,796,402 A | 8/1998 | Ellison-Taylor | |
| 5,798,752 A | 8/1998 | Buxton et al. | |
| 5,801,698 A | 9/1998 | Lection et al. | |
| 5,802,253 A | 9/1998 | Gross et al. | |
| 5,805,167 A | 9/1998 | Van Cruyningen | |
| 5,808,613 A * | 9/1998 | Marrin | G06F 17/30873 345/427 |
| 5,809,242 A | 9/1998 | Shaw et al. | |
| 5,812,769 A | 9/1998 | Graber et al. | |
| 5,819,055 A | 10/1998 | MacLean et al. | |
| 5,838,318 A | 11/1998 | Porter et al. | |
| 5,842,218 A | 11/1998 | Robinson | |
| 5,847,706 A | 12/1998 | Kingsley | |
| 5,852,809 A | 12/1998 | Abel et al. | |
| 5,861,885 A | 1/1999 | Strasnick et al. | |
| 5,893,091 A | 4/1999 | Hunt et al. | |
| 5,913,040 A | 6/1999 | Rakavy et al. | |
| 5,920,315 A | 7/1999 | Santos-Gomez | |
| 5,933,811 A | 8/1999 | Angles et al. | |
| 5,949,418 A | 9/1999 | Shields et al. | |
| 5,959,621 A | 9/1999 | Nawaz et al. | |
| 5,960,409 A | 9/1999 | Wexler | |
| 5,970,469 A | 10/1999 | Scroggie et al. | |
| 5,974,451 A | 10/1999 | Simmons | |
| 5,986,654 A | 11/1999 | Alexander et al. | |
| 5,995,943 A | 11/1999 | Bull et al. | |
| 5,996,007 A | 11/1999 | Klug et al. | |
| 6,008,809 A | 12/1999 | Brooks | |
| 6,034,661 A | 3/2000 | Servan-Scheiber et al. | |
| 6,037,937 A | 3/2000 | Beaton et al. | |
| 6,070,176 A * | 5/2000 | Downs | G06F 17/30696 707/E17.082 |
| 6,076,104 A | 6/2000 | McCue | |
| 6,088,708 A | 7/2000 | Burch et al. | |
| 6,097,387 A | 8/2000 | Sciammarella et al. | |
| 6,112,212 A | 8/2000 | Heitler | |
| 6,122,647 A | 9/2000 | Horowitz et al. | |
| 6,141,007 A | 10/2000 | Lebling et al. | |
| 6,154,205 A | 11/2000 | Carroll et al. | |
| 6,166,736 A | 12/2000 | Hugh | |
| 6,185,589 B1 | 2/2001 | Votipka | |
| 6,195,094 B1 | 2/2001 | Celebiler | |
| 6,237,006 B1 * | 5/2001 | Weinberg | G06F 11/32 345/419 |
| 6,233,600 B1 | 6/2001 | Salas et al. | |
| 6,246,411 B1 | 6/2001 | Strauss | |
| 6,248,946 B1 | 6/2001 | Dwek | |
| 6,275,829 B1 | 8/2001 | Angiulo et al. | |
| 6,300,947 B1 | 10/2001 | Kanevsky | |
| 6,310,631 B1 | 10/2001 | Cecco et al. | |
| 6,313,853 B1 | 11/2001 | Lamontagne et al. | |
| 6,313,855 B1 * | 11/2001 | Shuping | G06F 3/0481 707/E17.111 |
| 6,353,442 B1 | 3/2002 | Masui | |
| 6,377,285 B1 | 4/2002 | Doan et al. | |
| 6,380,940 B1 | 4/2002 | Halstead et al. | |
| 6,397,143 B1 * | 5/2002 | Peschke | G01C 21/20 701/432 |
| 6,414,698 B1 | 7/2002 | Lovell et al. | |
| 6,415,305 B1 | 7/2002 | Agrawal et al. | |
| 6,459,442 B1 | 10/2002 | Edwards et al. | |
| 6,462,759 B1 | 10/2002 | Kurtzberg et al. | |
| 6,583,800 B1 | 6/2003 | Ridgley et al. | |
| 6,603,493 B1 | 8/2003 | Lovell et al. | |
| 6,628,313 B1 | 9/2003 | Minakuchi et al. | |
| 6,636,210 B1 * | 10/2003 | Cheng | G06T 19/003 345/419 |
| 6,636,246 B1 | 10/2003 | Gallo et al. | |
| 6,639,611 B1 | 10/2003 | Leduc | |
| 6,647,534 B1 | 11/2003 | Graham | |
| 6,650,998 B1 | 11/2003 | Rutledge et al. | |
| 6,661,436 B1 | 12/2003 | Barksdale et al. | |
| 6,671,853 B1 | 12/2003 | Burkett et al. | |
| 6,675,351 B1 | 1/2004 | Leduc | |
| 6,684,087 B1 | 1/2004 | Yu et al. | |
| 6,697,033 B1 | 2/2004 | Leung et al. | |
| 6,704,024 B2 | 3/2004 | Robotham et al. | |
| 6,724,403 B1 | 4/2004 | Santoro et al. | |
| 6,731,316 B2 | 5/2004 | Herigstad et al. | |
| 6,747,680 B1 | 6/2004 | Igarashi et al. | |
| 6,801,908 B1 | 10/2004 | Fuloria et al. | |
| 6,825,860 B1 | 11/2004 | Hu et al. | |
| 6,832,353 B2 | 12/2004 | Itavaara et al. | |
| 6,859,907 B1 | 2/2005 | McGarry | |
| 6,865,719 B1 | 3/2005 | Nicholas, III | |
| 6,882,755 B2 | 4/2005 | Silverstein et al. | |
| 6,919,890 B2 | 7/2005 | Halstead | |
| 6,928,436 B2 | 8/2005 | Baudel | |
| 6,938,221 B2 | 8/2005 | Nguyen | |
| 6,968,511 B1 | 11/2005 | Robertson et al. | |
| 6,993,726 B2 | 1/2006 | Rosenholtz et al. | |
| 7,013,435 B2 | 3/2006 | Gallo | |
| 7,027,052 B1 | 4/2006 | Thorn et al. | |
| 7,051,276 B1 | 5/2006 | Mogilevsky et al. | |
| 7,055,110 B2 | 5/2006 | Kupka | |
| 7,065,707 B2 | 6/2006 | Chen et al. | |
| 7,069,506 B2 | 6/2006 | Rosenholtz et al. | |
| 7,076,742 B1 | 7/2006 | Thorn et al. | |
| 7,085,994 B2 * | 8/2006 | Gvily | G06F 17/3089 707/E17.116 |
| 7,143,347 B2 | 11/2006 | Su | |
| 7,165,228 B2 | 1/2007 | Taylor et al. | |
| 7,203,901 B2 | 4/2007 | Chen et al. | |
| 7,210,107 B2 | 4/2007 | Wecker et al. | |
| 7,219,309 B2 * | 5/2007 | Kaasila | G06F 17/30905 715/209 |
| 7,222,306 B2 | 5/2007 | Kaasila et al. | |
| 7,228,492 B1 | 6/2007 | Graham | |
| 7,246,306 B2 | 7/2007 | Chen et al. | |
| 7,248,262 B2 | 7/2007 | Cao | |
| 7,262,811 B2 | 8/2007 | Burke | |

(56) References Cited

U.S. PATENT DOCUMENTS

| | | | |
|---|---|---|---|
| 7,310,779 B2 | 12/2007 | Carro | |
| 7,325,198 B2 | 1/2008 | Adcock et al. | |
| 7,327,349 B2 | 2/2008 | Robbins et al. | |
| 7,412,650 B2 | 8/2008 | Gallo | |
| 7,432,984 B2 | 10/2008 | Oh | |
| 7,434,174 B2 | 10/2008 | Sellers et al. | |
| 7,444,340 B2 | 10/2008 | Padgett | |
| 7,461,353 B2 | 12/2008 | Rohrabaugh et al. | |
| 7,487,447 B1 | 2/2009 | Jerger | |
| 7,555,725 B2 * | 6/2009 | Abramson | G01C 21/367 701/532 |
| 7,599,988 B2 | 10/2009 | Frank | |
| 7,644,376 B2 | 1/2010 | Karachale et al. | |
| 7,685,619 B1 | 3/2010 | Herz | |
| 7,735,018 B2 * | 6/2010 | Bakhash | G06F 3/04815 345/419 |
| RE42,413 E * | 5/2011 | Snyder | G06F 17/30864 707/770 |
| 8,001,476 B2 | 8/2011 | Gallo | |
| 8,090,776 B2 | 1/2012 | Torres et al. | |
| 8,418,075 B2 | 4/2013 | Gallo et al. | |
| 8,793,604 B2 | 7/2014 | Gallo et al. | |
| 9,304,837 B2 | 4/2016 | Gallo | |
| 2001/0028369 A1 | 10/2001 | Gallo et al. | |
| 2001/0030667 A1 * | 10/2001 | Kelts | G06F 3/0481 715/854 |
| 2001/0035885 A1 | 11/2001 | Iron et al. | |
| 2002/0000998 A1 | 1/2002 | Scott et al. | |
| 2002/0033837 A1 | 3/2002 | Munro | |
| 2002/0089532 A1 * | 7/2002 | Cohen | G06F 17/3089 715/736 |
| 2002/0089549 A1 | 7/2002 | Munro et al. | |
| 2002/0105551 A1 * | 8/2002 | Kamen | G06F 3/04815 715/850 |
| 2002/0112237 A1 | 8/2002 | Kelts | |
| 2002/0118226 A1 | 8/2002 | Hough et al. | |
| 2002/0133627 A1 | 9/2002 | Maes et al. | |
| 2002/0138502 A1 | 9/2002 | Gupta | |
| 2002/0143826 A1 | 10/2002 | Day et al. | |
| 2002/0149605 A1 | 10/2002 | Grossman | |
| 2002/0154168 A1 | 10/2002 | Ijas et al. | |
| 2002/0184111 A1 | 12/2002 | Swanson | |
| 2002/0191028 A1 | 12/2002 | Senechalle et al. | |
| 2002/0194217 A1 | 12/2002 | Hoffman et al. | |
| 2002/0196287 A1 | 12/2002 | Taylor et al. | |
| 2003/0052912 A1 | 3/2003 | Bowman et al. | |
| 2003/0055832 A1 | 3/2003 | Roccaforte | |
| 2003/0081012 A1 | 5/2003 | Chang | |
| 2003/0093794 A1 | 5/2003 | Thomas et al. | |
| 2003/0158846 A1 | 8/2003 | Ikehata et al. | |
| 2003/0160832 A1 | 8/2003 | Ridgley et al. | |
| 2003/0179189 A1 | 9/2003 | Lira | |
| 2003/0179231 A1 * | 9/2003 | Kamiwada | G06F 3/04815 715/757 |
| 2003/0179239 A1 | 9/2003 | Lira | |
| 2003/0182628 A1 | 9/2003 | Lira | |
| 2003/0204536 A1 | 10/2003 | Keskar et al. | |
| 2003/0217121 A1 | 11/2003 | Willis | |
| 2003/0229900 A1 | 12/2003 | Reisman | |
| 2003/0233241 A1 | 12/2003 | Marsh | |
| 2004/0003097 A1 | 1/2004 | Willis et al. | |
| 2004/0003402 A1 | 1/2004 | McKenna, Jr. | |
| 2004/0008224 A1 | 1/2004 | Molander et al. | |
| 2004/0012626 A1 | 1/2004 | Brookins | |
| 2004/0030741 A1 * | 2/2004 | Wolton | G06F 17/30873 709/202 |
| 2004/0044499 A1 | 3/2004 | House et al. | |
| 2004/0054968 A1 | 3/2004 | Savage | |
| 2004/0078816 A1 | 4/2004 | Johnson | |
| 2004/0100509 A1 | 5/2004 | Sommerer et al. | |
| 2004/0109031 A1 | 6/2004 | Deaton et al. | |
| 2004/0128353 A1 | 7/2004 | Goodman et al. | |
| 2004/0133848 A1 | 7/2004 | Hunt et al. | |
| 2004/0135820 A1 * | 7/2004 | Deaton | G06F 3/04815 715/848 |
| 2004/0135824 A1 | 7/2004 | Fitzmaurice | |
| 2004/0160462 A1 | 8/2004 | Sheasby et al. | |
| 2004/0168115 A1 | 8/2004 | Bauernschmidt et al. | |
| 2004/0205536 A1 | 10/2004 | Newman et al. | |
| 2004/0215657 A1 | 10/2004 | Drucker et al. | |
| 2004/0233222 A1 | 11/2004 | Lee et al. | |
| 2004/0252119 A1 | 12/2004 | Hunleth et al. | |
| 2004/0263513 A1 | 12/2004 | Smith et al. | |
| 2004/0267701 A1 | 12/2004 | Horvitz et al. | |
| 2004/0267730 A1 | 12/2004 | Dumais et al. | |
| 2004/0268413 A1 | 12/2004 | Reid et al. | |
| 2005/0022116 A1 | 1/2005 | Bowman et al. | |
| 2005/0065913 A1 | 3/2005 | Lillie et al. | |
| 2005/0081241 A1 | 4/2005 | Chen | |
| 2005/0086612 A1 | 4/2005 | Gettman et al. | |
| 2005/0097008 A1 | 5/2005 | Ehring et al. | |
| 2005/0097444 A1 | 5/2005 | Ivarsey et al. | |
| 2005/0097606 A1 | 5/2005 | Scott, III et al. | |
| 2005/0116966 A1 | 6/2005 | Graham et al. | |
| 2005/0149879 A1 | 7/2005 | Jobs et al. | |
| 2005/0149880 A1 | 7/2005 | Postrel | |
| 2005/0151884 A1 | 7/2005 | Oh | |
| 2005/0166158 A1 | 7/2005 | Blanchard et al. | |
| 2005/0195221 A1 | 9/2005 | Berger et al. | |
| 2005/0210399 A1 | 9/2005 | Filner et al. | |
| 2005/0257240 A1 | 11/2005 | Faulkner et al. | |
| 2005/0283739 A1 * | 12/2005 | Mohr | G06F 3/0481 715/800 |
| 2006/0020903 A1 | 1/2006 | Wang et al. | |
| 2006/0026013 A1 | 2/2006 | Kraft | |
| 2006/0036955 A1 | 2/2006 | Baudisch et al. | |
| 2006/0053450 A1 | 3/2006 | Saarikivi et al. | |
| 2006/0064647 A1 | 3/2006 | Tapuska et al. | |
| 2006/0085767 A1 | 4/2006 | Hinckley et al. | |
| 2006/0156228 A1 | 7/2006 | Gallo et al. | |
| 2006/0195782 A1 | 8/2006 | Wang et al. | |
| 2006/0200779 A1 | 9/2006 | Taylor | |
| 2006/0242557 A1 | 10/2006 | Nortis, III | |
| 2006/0256130 A1 | 11/2006 | Gonzalez | |
| 2006/0265669 A1 | 11/2006 | Lee | |
| 2006/0268100 A1 | 11/2006 | Karukka et al. | |
| 2007/0038643 A1 | 2/2007 | Epstein | |
| 2007/0050708 A1 | 3/2007 | Gupta et al. | |
| 2007/0168413 A1 | 7/2007 | Barletta et al. | |
| 2007/0198917 A1 | 8/2007 | Rohrabaugh et al. | |
| 2007/0206221 A1 | 9/2007 | Wyler et al. | |
| 2007/0288841 A1 | 12/2007 | Rohrabaugh et al. | |
| 2007/0288855 A1 | 12/2007 | Rohrabaugh et al. | |
| 2008/0028335 A1 | 1/2008 | Rohrabaugh et al. | |
| 2008/0115047 A1 * | 5/2008 | Petri | G06F 17/30873 715/205 |
| 2008/0144107 A1 | 6/2008 | Lieb | |
| 2011/0283208 A1 | 11/2011 | Gallo | |
| 2016/0170586 A1 | 6/2016 | Gallo | |

FOREIGN PATENT DOCUMENTS

| | | |
|---|---|---|
| EP | 1195664 A1 | 4/2002 |
| GB | 2303231 A | 2/1997 |
| WO | WO 1996/007958 A1 | 3/1996 |
| WO | WO 2001/080098 A3 | 10/2001 |

OTHER PUBLICATIONS

International Search Report and Written Opinion for International Patent Application No. PCT/US2005/020514, dated Jun. 29, 2006, 9 pgs.

Bederson, Ben, et al., "Implementing a Zooming User Interface: Experience Building Pad++," [online] retrieved on Apr. 20, 2006, from the Internet <URL:http://http://mrl.nyu.edu/publications/zooming/zooming.pdf>, 34 pgs.

Bederson, Benjamin B., et al., "Pad++: A Zoomable Graphical Sketchpad for Exploring Alternate Interface Physics," [online] retrieved on Apr. 20, 2006, from the Internet <URL:http://mrl.nyu.edu/publications/jvlc-96-pad/jvlc-96-pad.pdf>, 30 pgs.

(56) References Cited

OTHER PUBLICATIONS

"Google Earth—Home" Google, 2006 [online] retrieved on Apr. 24, 2006, from the Internet <URL:http://earth.google.com/>.
Herot, C.F., "Spatial Management of Data," ACM Transactions on Database Systems, Dec. 1980, pp. 493-514, vol. 5, No. 4.
Perlin, Ken, et al., "Pad: An Alternative Approach to the Computer Interface," [online] retrieved on Apr. 20, 2006, from the Internet <URL:http://mrl.nyu.edu/publications/sig93-pad/siggraph-93-origpad.pdf>, 11 pgs.
"Piccolo Home Page," [online] retrieved on Apr. 20, 2006, from the Internet <URL:http://www.cs.umd.edu/ticil/piccolo/learn/patterns.shtml>, 18 pgs.
"RSS (file format)—Wikipedia, the free encyclopedia", Wikipedia® [online] retrieved on Apr. 20, 2006, from the Internet <URL:http://en.wikipedia.org/wiki/Rss_feeds>, 8 pgs.
"Web feed—Wikipedia, the free encyclopedia" Wikipedia® [online] retrieved on Apr. 20, 2006, retrieved from the Internet <URL:http://en.wikipedia.org/wiki/Web_feed, 2 pgs.
"Zooming Applet", New York University Media Research Lab, 1997, [online] retrieved on Apr. 20, 2006, from the Internet <URL:http://mrl.nyu.edu/.about.perlin/zoom/TestButton.html>, 1 pg.
"Zooming User Interface—Wikipedia, the free encyclopedia", Wikipedia®, [online] retrieved on Apr. 20, 2006, from the Internet <URL:http://en.wikipedia.org/wiki/Zooming_user_interface>, 1 pg.
Office Action for U.S. Appl. No. 11/281,924, dated Jan. 28, 2008, 35 pgs.
Office Action for U.S. Appl. No. 11/281,043, dated Apr. 17, 2008, 18 pgs.
Office Action for U.S. Appl. No. 11/281,924, dated Oct. 3, 2008, 45 pgs.
Office Action for U.S. Appl. No. 11/281,043, dated Jan. 21, 2009, 16 pgs.
Office Action for U.S. Appl. No. 11/281 924, dated May 11, 2009, 40 pgs.
Office Action for U.S. Appl. No. 11/281,043, dated Sep. 1, 2009, 16 pgs.
Office Action for U.S. Appl. No. 11/281,924, dated Dec. 8, 2009, 39 pgs.
Baudish, Patrick, et al., Collapse-to-zoom: viewing web pages on small screen devices by interactively removing irrelevant content, Oct. 24-27, 2004, ACM, 5 pgs.
Shannon, Ross, DHTML Explained, Oct. 3, 2003, 4 pgs. retrieved on Dec. 30, 2009, from internet <http://web.archive.org/web/20031003023520/http://www.yourhtmlsource . . . >.
Office Action for U.S. Appl. No. 11/281,043, dated Apr. 27, 2010, 17 pgs.
Office Action for U.S. Appl. No. 11/281,924, dated Jul. 22, 2010, 44 pgs.
Office Action for U.S. Appl. No. 11/281,924, dated Jan. 5, 2011, 41 pgs.
Office Action for U.S. Appl. No. 11/281,924, dated Jul. 21, 2011, 44 pgs.
Office Action for U.S. Appl. No. 11/281,924, dated Feb. 27, 2012, 48 pgs.
Office Action for U.S. Appl. No. 11/281,924, dated Aug. 7, 2012, 56 pgs.
Office Action for U.S. Appl. No. 13/174,543, dated Apr. 29, 2013, 11 pgs.
Office Action for U.S. Appl. No. 13/787,403, dated Aug. 30, 2013, 15 pgs.
Office Action for U.S. Appl. No. 13/174,543, dated Jan. 16, 2014, 21 pgs.
Notice of Allowance for U.S. Appl. No. 13/174,543, dated Jul. 1, 2015, 6 pgs.
Office Action issued for U.S. Appl. No. 15/051,208, dated May 15, 2018, 19 pages.

\* cited by examiner

CELLULAR ENVIRONMENT IN FLAT
NAVIGATION MODE 350

CELLULARIZED ENVIRONMENT IN
SPHERICAL NAVIGATION MODE 360

SPATIALLY DRIVEN CONTENT PRESENTATION IN A CELLULAR ENVIRONMENT

CROSS REFERENCE TO RELATED APPLICATIONS

This application is a continuation of U.S. application Ser. No. 13/787,403, filed Mar. 6, 2013, now issued as U.S. Pat No. 8,793,604, which application is a continuation of U.S. application Ser. No. 11/281,924, filed Nov. 16, 2005, now issued as U.S. Pat. No. 8,418,075, which application claims the benefit under 35U.S.C. § 119(e) to U.S. Provisional Patent Application No. 60/628,939, filed Nov. 16, 2004, entitled "Interactive Content Development, Management, and Presentation," all of which are incorporated by reference in their entirety. This application is related to U.S. patent application Ser. No. 11/281,043 filed Nov. 16, 2005, now issued as U.S. Pat. No. 8,001,476, entitled "Cellular User Interface," which is incorporated by reference herein in its entirety.

FIELD OF ART

The present description relates generally to graphical user interfaces for computing devices and more particularly to integrated presentation of content via cells arranged geometrically in a cellular environment.

BACKGROUND

In computer systems, an information object such as a file stores information (also referred to as content) in a particular format that is accessible by invoking a native application capable of reading and processing that format. For example, documents in different formats are accessible via different word processing applications. To access information objects via conventional graphical user interfaces (GUIs), users typically locate the information object and invoke an application capable of providing access to the information.

Many conventional graphical user interfaces organize and display information objects hierarchically in file systems comprising directories (e.g. folders) and files at one or more levels. To access a particular information object, users must selectively traverse through the file system by repeatedly selecting a series of nested directories by clicking on directory icons to access a lower level directory containing the information object. The hierarchy of a conventional file system is typically created manually by the user by creating the nested, hierarchical arrangement of directories and moving the information object into one of these directories. This process of manually organizing objects requires the user to invest considerable time and attention in deciding on which directories and subdirectories to create, and where to place information objects within them. In addition, once created, the hierarchical directory structure is entirely static, and does not change unless the user purposely creates, deletes, or reorganize the contents.

Hierarchical organization of information objects in conventional GUIs also suffers from a tradeoff between focus and context. While viewing a hierarchical directory structure, users have access to the context of an information object, such as the location of the object in a hierarchical file system, but they are unable to access the detailed information in a particular object. On the other hand, while accessing the detailed information in a particular object, for example while viewing a video file, users are likely to lose context of where the information is in a hierarchy or in an overall information schema. This loss of context while accessing the content of an information object can inhibit understanding of the content and can make it difficult for a user to find logically related information. One example of a hierarchical file system that suffers from a tradeoff between context and focus is Windows Explorer provided by the Microsoft Corporation.

In conventional graphical user interfaces such as the Windows operating system, the icon or symbol associated with an information object provides only limited information about the file or folder, typically only the name and type of information object and the associated application for accessing the object. For example, a Microsoft Word document has an icon resembling a sheet of paper. Unless a user already knows the contents of an information object, the information object's icon provides no additional information about the content of the information object to the user to facilitate a decision as to whether or not to access the object.

Conventional graphical user interfaces also allow users to search for information that meets specified parameters. For example, Windows Explorer allows users to search for particular file names, file attributes (e.g., type, modification date), or the contents of a file (e.g., words contained therein). However, such search mechanisms require users to generate queries to retrieve relevant information, that is, to know that they are looking for something in particular at a given time. Further, a set of information objects retrieved by a query are not organized to facilitate navigation by a user based on logical relationships between the content of the objects.

Conventional techniques for rendering graphics include mipmapping. Mipmaps are pre-calculated, optimized collections of bitmap images. Bitmap images in a mipmap are different resolution versions of a single underlying image or texture map. When a user zooms in to a graphic, increasingly higher resolution ones of the images are displayed; as the user zooms out, increasingly lower resolution ones of the images are displayed. In mipmapping, the low resolution images are simply downconverted versions of one or more of the high resolution images. Thus, at best, mipmapping changes the pixel resolution of a displayed image based on a current zoom level. Conventional mipmapping techniques are unable to present different content, different types of information objects, and/or information objects from different sources in response to a current zoom level.

SUMMARY

A cellular user interface provides a cellular environment (also known as a world or cellularized environment) for accessing various types of content from multiple information objects (also known as content sources or data sources) via cells arranged geometrically in the cellular environment. The cellular environment provides for spatial arrangement or spatial configuration of cells in a two-dimensional or three-dimensional space. The cellular environment has various environment attributes such as the number and arrangement of cells in the cellular environment. Each cell has cell attributes such as the geometric properties of the cell and the form, type, or source of visual representations of information displayed by the cell.

Navigation of the cellular environment is supported, including panning over the cellular environment and zooming in or out of the cellular environment to arrive at a particular zoom state. Navigation of a cellular environment by panning or zooming can change the environment attributes of the cellular environment, such as the number of cells or the arrangement of the cells. Navigation of a cellular environment can also change the attributes of one or more of the cells.

Navigation of the cellular environment can be performed in response to user input. Alternatively, navigation, including changing the orientation and/or zoom state of a cellular environment, can occur in response to external events such as a change in the content of an underlying information object. The change in content, can be, for example a change in a website, a database, or a data feed (e.g., a stock feed, news feed, RSS feed, or the like). By facilitating navigation functions such as panning and zooming, one embodiment of the present invention enables a user to focus on the content of a particular information object while maintaining a sense of context in the cellular environment.

The user can access the cellular environment at any of a number of zoom states. At each zoom state, one or more cells are arranged geometrically in the cellular environment, the arrangement depending at least in part on the zoom state. Content to be outputted via each cell or group of cells at a particular zoom state is obtained by resolving a content reference associated with the cell or with a group of cells at the zoom state. Different cells or different groups of cells can be associated with different content references. The content to be outputted via a cell at each zoom state includes a visual representation such as an image, text, video, or graphic. Visual representations of information at each zoom state provide simultaneous access to content from various underlying information objects via a uniform interface. Visual representations also provide visual cues (e.g. red cells indicate fast-changing stock price) that facilitate a user's navigation decisions. Further, visual representations outputted via cells can be supplemented by non-visual content, such as audio output, that provide access to information and facilitate navigation.

Cells arranged geometrically in a cellular environment are capable of outputting different types of content depending on the zoom state. According to one embodiment, zooming in to a cell outputs content associated with the cell in greater level of detail. According to another embodiment, zooming in to a cell displays a plurality of cells for outputting content associated with the cell. The content associated with a cell or with a group of cells at different zoom states can be in different media types such as audio, video, text, images and graphics. Further, the content associated with a cell or a group of cells at different zoom states can be obtained from different data sources. The data sources can be local or remotely located on a network. Examples of data sources include websites, databases, RSS feeds, podcasts, and television broadcasts. Content at different zoom states can also have different formats and can be accessible using different native applications. The content formats can include application-specific formats for spreadsheets, text files, word processing files, images, database files, web pages, audio files, video files, etc. Further, content associated with a cell at different zoom states can have different semantic density, thereby providing a user with additional details as he zooms closer to the cellular environment. By selecting different zoom states, users can also increase the resolution of a cell or change the quality of its content.

Each cell is configured to be able to combine various types of information for presentation at a single zoom state, such as text, audio, video, images, animation, and web page content. Moreover, a cell can combine information from different sources, even if each source has a different format accessible via a unique native application. For example, by converting information from underlying sources into a common format, an individual cell can display text from a text document alongside streaming video from a video file.

Users can navigate one or more zoom states associated with a cell or a group of cells to access logically related information. Information can be logically related such as when it relates to a common topic or time-period, or when the information is otherwise amenable to some form of common classification. For example, in a situational awareness control center application that provides unified access to information about ongoing emergencies in a city, a user can access information about active fire alarms in one or more zoom states associated with a cellular environment. A first zoom state for a fire alarm cell provides a number representing active fire alarms in a city, while another zoom state provides a map showing the locations of the alarms. A further zoom state for the fire alarm cell provides streaming video of the site where an alarm is occurring. At yet another zoom state, users may interact with an information object in a particular format by invoking a native application associated with that format. While users are focusing on specific information, context information is also available to users by panning, zooming or based on logical relationships between cells in a view.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Navigation of a Cellular Environment

Figure 1:
FIG. 1 illustrates a sample graphical user interface providing a situational awareness control center for emergency response.
Figure 3A:
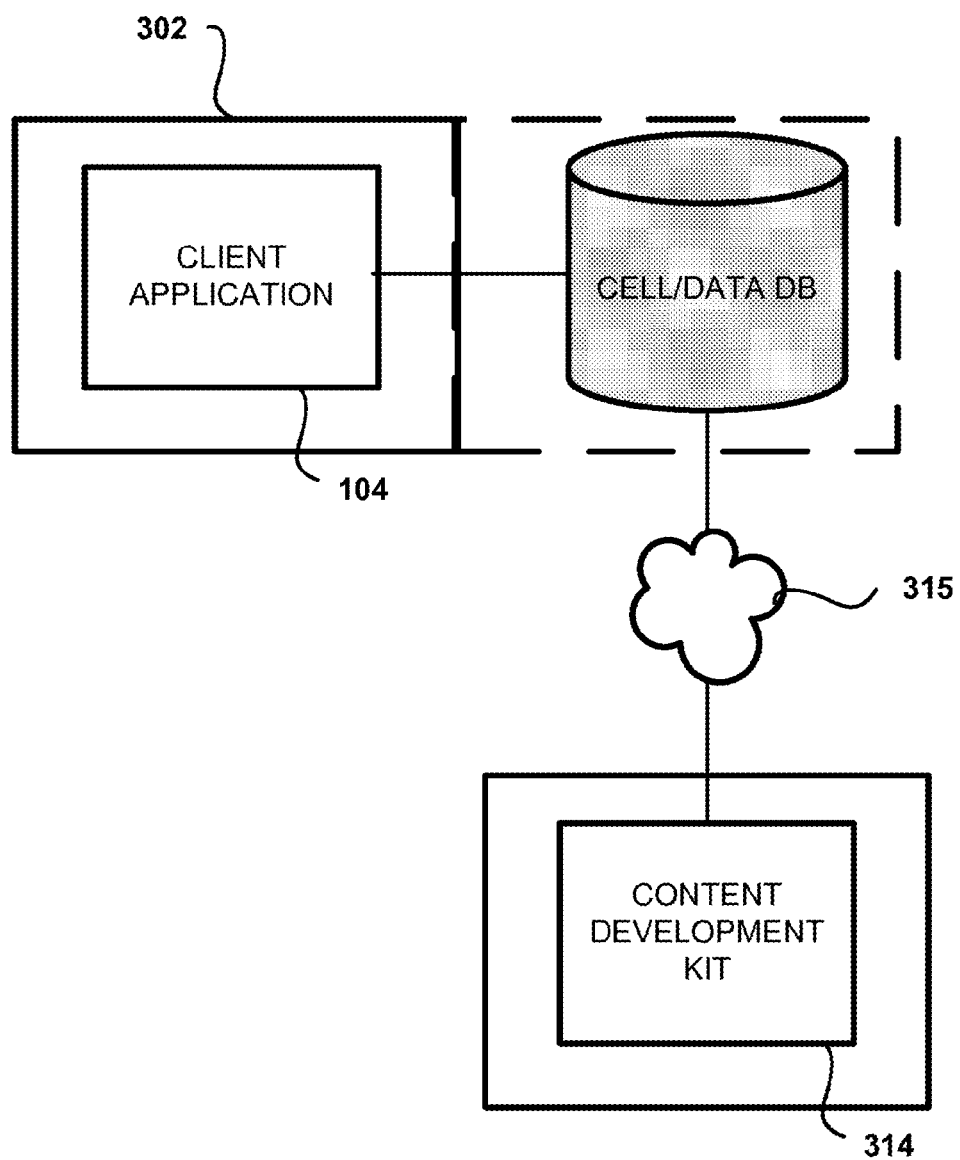
FIG. 3A is a block diagram illustrating a sample client configuration according to one embodiment.
Figure 3B:
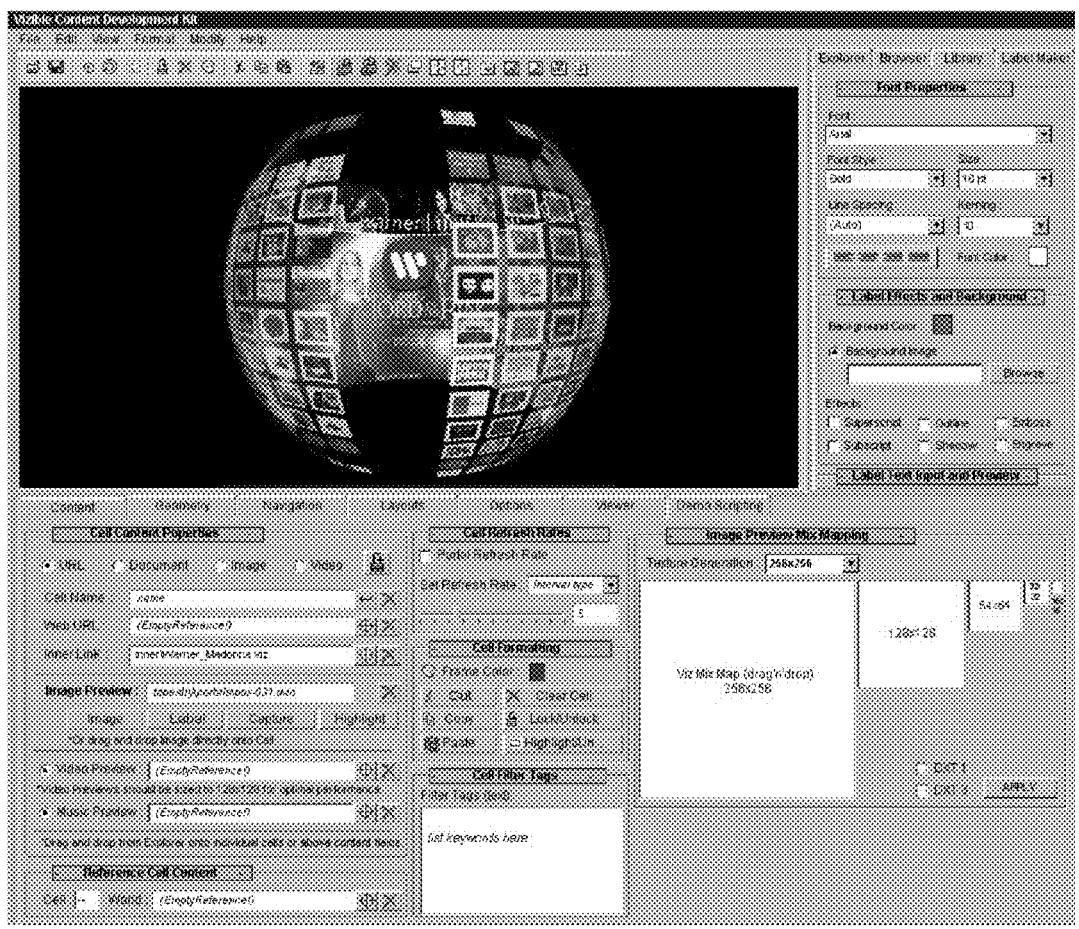
FIG. 3B is a sample user interface for a content development kit module according to one embodiment.
Figure 3C:
FIG. 3C is a sample cellular user interface illustrating a cellular environment in flat navigation mode.
Figure 3D:
FIG. 3D shows a sample cellular user interface illustrating a cellular environment in spherical navigation mode.
Figure 4:
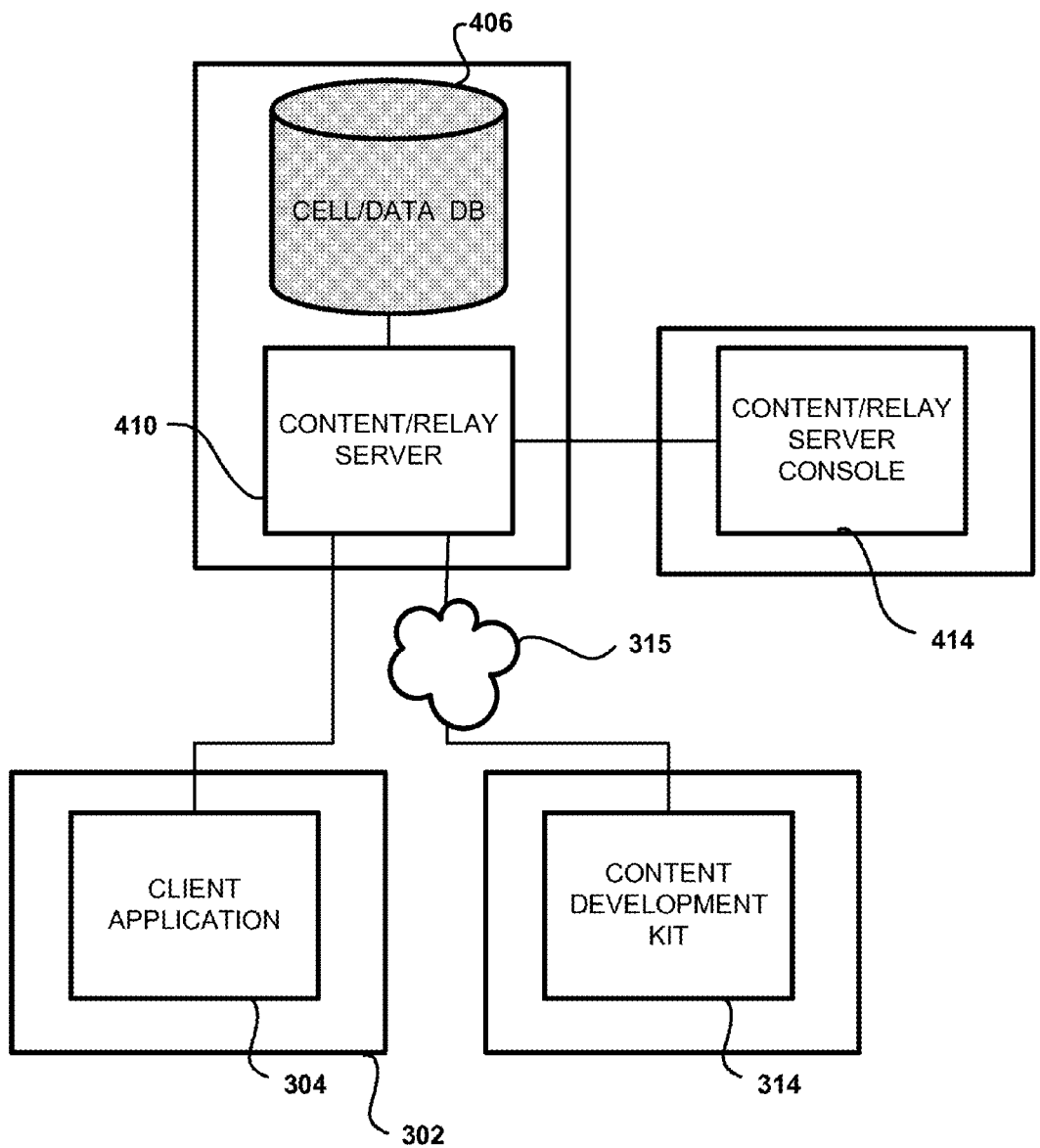
FIG. 4 is a block diagram illustrating a relay server system configuration according to one embodiment.
Figure 5:
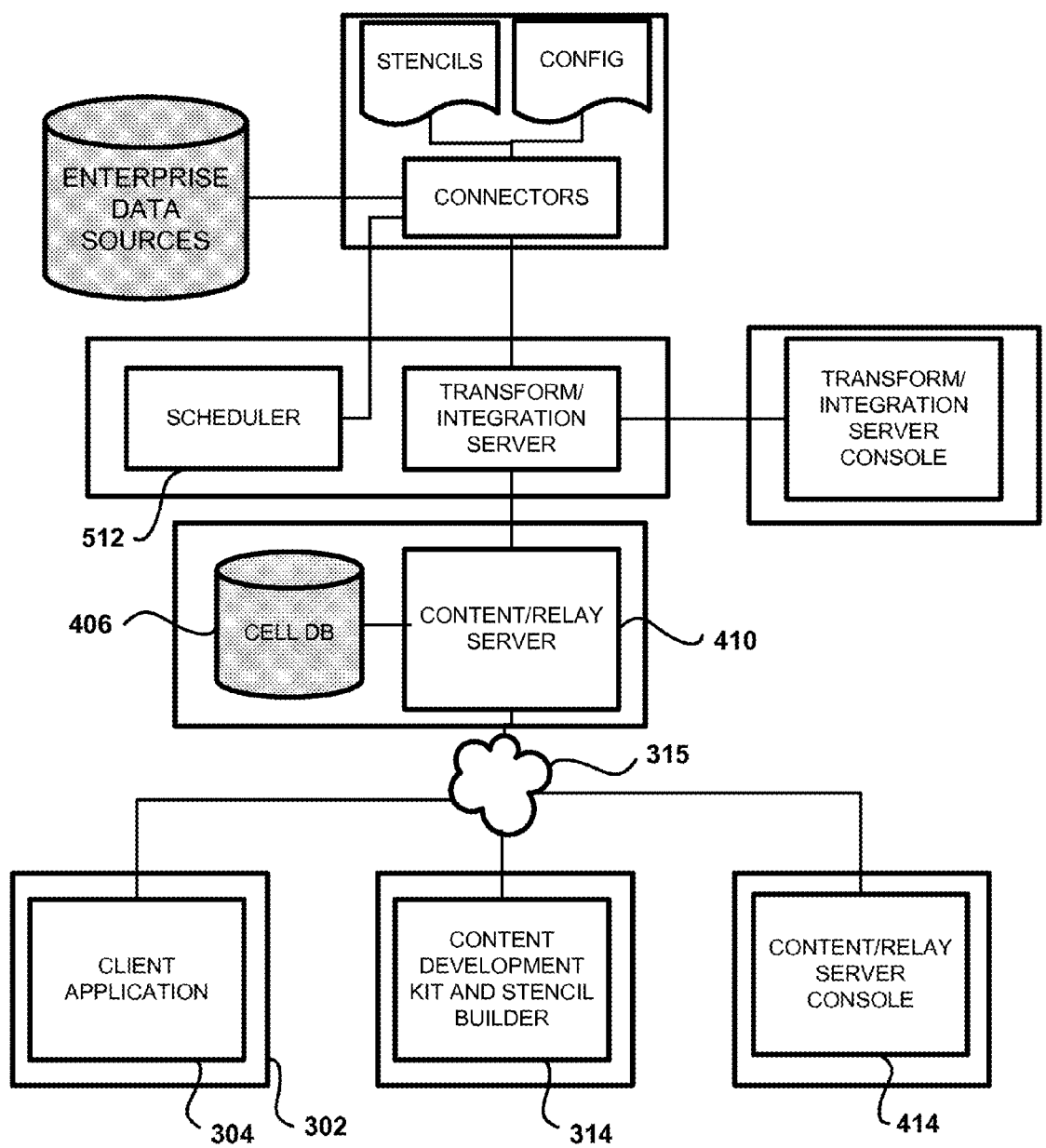
FIG. 5 is a block diagram illustrating a scheduled data update system configuration according to one embodiment.
Figure 6:
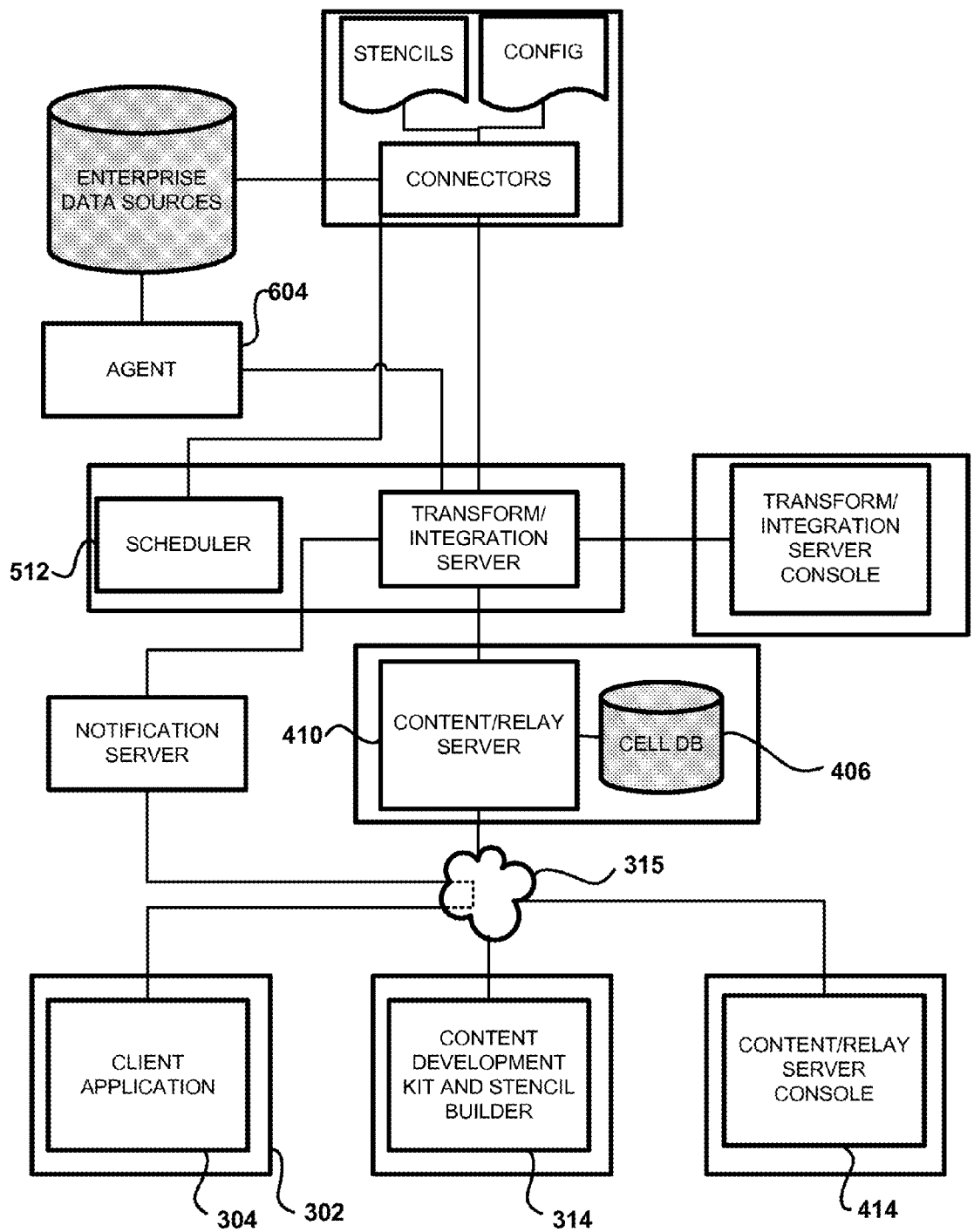
FIG. 6 is a block diagram illustrating a live cell system configuration according to one embodiment.

Referring to FIGS. 1A-1E, display 105 represents any display device, now known or later developed, that is capable of outputting data to a user in visual form. Display 105 shows a cellular environment, comprising various cells 110 arranged geometrically in a cellular environment. Each cell 110 is associated with underlying content that is accessible via visual representations displayed within the cell's boundaries. In one embodiment, cells are positioned geometrically at various locations in a cellular environment to represent a particular shape to a viewer, as seen for example in the global cellular environment in FIG. 3D. The cellular environment in FIGS. 1A-1E is shown in what is called a Flat Navigation Mode 350, in which cells are arranged geometrically to represent a flat surface of finite or infinite extent. Flat Navigation Mode 350 is also illustrated in FIG. 3C, which shows a group of cells associated with Green Day arranged to represent a planar surface. A navigation mode can also be referred to as a geometric configuration of the cellular environment. Another exemplary navigation mode for a cellular environment is a Spherical Navigation Mode 360, in which cells are arranged geometrically to represent an inner spherical surface or an outer spherical surface. Spherical Navigation Mode 360 is illustrated in FIG. 3D, which shows groups of cells associated with different genres of music arranged to represent the outer surface of a sphere. Yet another exemplary navigation mode for a cellular environment is a Cubical Navigation Mode, in which cells can be arranged geometrically to represent a cubical surface. A cellular environment can also allow users to simultaneously access cells arranged geometrically in various navigation modes, such as the situational awareness control center 109 (also referred to as a command and control center) shown in FIG. 1.

Navigation of the cellular environment is supported, including panning over the cellular environment and zooming in or out of the cellular environment to arrive at a particular zoom state. Navigation of a cellular environment by panning or zooming can change environment attributes such as the number and arrangement of the displayed cells in the cellular environment. Navigation of a cellular environment can also change cell attributes such as geometric properties, actionable features, and visual representations displayed via cells arranged geometrically in the cellular environment. One skilled in the art will recognize that navigation of a cellular environment can be triggered by various input devices, now known or later developed, such as a mouse, keyboard or joystick.

Panning

Panning over a cellular environment changes the orientation of the cellular environment relative to a point of view (e.g., a virtual camera) and provides views of different portions of the environment. In each view, one or more cells are arranged geometrically in the cellular environment. Panning over a cellular environment in flat navigation mode moves a user horizontally over cells arranged geometrically to represent a planar surface, while panning over a cellular environment in cubical or spherical navigation mode enables a user to navigate over cells arranged geometrically to represent a spherical surface.

Zooming

Zooming can be used to change the distance between a user and a cellular environment, conventionally referred to as the camera distance. Zooming can also be used to change the distance between the cellular environment and display 105, thereby changing the portion of the cellular environment that is visible to a user. For example, referring to FIG. 1A, zoom state B shows a smaller portion of a cellular environment than zoom state A and provides a higher level of zoom.

Zooming in or out of a cellular environment allows a user to access one or more zoom states associated with the cellular environment. The cellular environment is associated with environment attributes such as geometry definitions 252, geometry mappings 254 and procedural geometry 256, which are explained in further detail below with reference to FIG. 2. The geometry definition 252 for a particular zoom state specifies which cells are to be arranged in the cellular environment as well as how the cells should be arranged at that zoom state. A cellular environment is associated with different geometry definitions 252 for different navigation modes. For each cell to be displayed geometrically in a cellular environment, cell feature definitions 210, also referred to as cell attributes, specify the characteristics of the cell at a particular zoom state. One type of cell attribute 210 is the geometric properties 213, which specify the size and shape of a cell at different zoom states. Another type of cell attribute 210 is the zoom state definitions 212 which provide content references associated with a cell or a group of cells at different zoom states. Each content reference provides a reference to content associated with a zoom state, including one or more visual representations for the zoom state. Cell attributes 210 are explained in further detail below with reference to FIG. 2.

Displayed content can change abruptly as a user zooms in or zooms out. Alternatively, content at one zoom state can gradually replace the content at another zoom state as a user zooms in or zooms out. For example, content displayed at a first zoom state can gradually fade out and content at a second zoom state can gradually blend in as a user navigates to the second zoom state.

Zooming enables a user to focus on a particular type of information in a cell or a group of cells. Zooming may also change the resolution of information displayed in a cell or a group of cells. Moreover, zooming in to or out of a group of cells can re-arrange the cells or output a second group of cells. The dimensions of cellular content can also change as a user zooms in to a cell or a group of cells. For example, a two-dimensional visual representation for a cell at a first zoom state can be replaced by one or more three-dimensional cells as the user zooms in. Changing the zoom state can also activate different applications to enable a user to interact with the underlying content. While users are zooming in to focus on particular types of content, context information is simultaneously available based on the content of other cells in a view, based on logical relationships between cells in the view, or by zooming in or out.

Zooming in or out of a cell or a group of cells provides access to logically related information. Cell attributes 210 such as zoom state definitions 212 specify the changes in cellular content, including visual representations as well as non-visual content, at different zoom states. According to one embodiment, the visual representations at various zoom states are different types of information. For example, in a financial services application, zooming in to cell displaying a small image of a stock symbol results in the display within the cell of a larger image comprising the company's name at one zoom state; zooming in further on the cell results in the cell displaying a still larger image with a graph of the company's stock price at another zoom state. Note that different images may be pre-computed and stored in a file at client 302 or at content server 410 for easy retrieval and navigation. Alternatively, zooming in to a cell provides a plurality of cells for outputting content associated with the cell.

Groups of cells displayed in close proximity to each other with some relationship between the cells are called channels. For example, a group of the cells can be arranged into a channel based upon their metadata matching a query term. A user can zoom in to a channel comprising a group of cells associated with a particular type of information. For example, in a situational awareness control center application, a user can zoom in to a cell representing a public safety emergency to obtain a channel comprising a group of cells that provide information about the emergency. Various cells in the channel provide simultaneous access to information about the emergency from various sources, such as websites, RSS feeds, news channels, and on-site cameras. Further, a user navigating a first cellular environment can zoom in to a cell in the environment to access a second cellular environment, wherein the first cellular environment is referred to as an outer world for the cell while the second cellular environment is referred to as an inner world for the cell.

Zooming in or out of a cellular environment can simultaneously change the zoom states for more than one cells or groups of cells. For example, in a situational awareness control center application for a city, a plurality of cells are arranged for display in various groups. Thus, one group of cells provides information about an ongoing fire, while another group of cells provides information about a hostage standoff, yet another group of cells provides traffic information for the city, and another group of cells displays location and status information on police units and fire fighter units in the city. The various groups of cells can be displayed in the cellular environment in a single navigation mode or in different navigation modes. A user can change the zoom states for more than one groups of cells simultaneously, for example resulting in the output of additional content associated with the fire as well as the hostage standoff. Alternatively, the user can selectively zoom in to a single group of cells arranged in a cellular environment without changing the zoom state of other cells arranged in the cellular environment. Further, zooming in to or out of one cell can also change the information displayed in other neighboring cells. For example, zooming in on the cells associated with the fire results in the traffic group of cells being updated to display traffic information in the vicinity of the fire, and the status information of the police and fire fighter units to be limited to those in the vicinity of the fire.

Example Zoom States

A user can navigate between any number of zoom states that can be designated by various names such as World Overview, Cell Activated, Cell Selected, Zoom Swap In, Zoom Swap Out, and Zoom to Levels. For example, World Overview is a zoom state providing an overview of cells in a world as well as their layout or arrangement. Cell Activated specifies the zoom state of a cell when an application is invoked within the cell. Cell Selected specifies the zoom state of a cell when a cell has been selected, for example by clicking on the cell with a mouse. Zoom Swap In specifies the zoom state while a world is being loaded in response to a user zooming in to a cell, Zoom Swap Out specifies the zoom state while a world is being loaded in response to a user zooming out of a cell, and Zoom to Levels specifies that when a user zooms in or out the zoom state is determined based on the resolution of an image or other visual representation to be displayed.

Illustrative Applications of a Cellular GUI

Figure 1A:
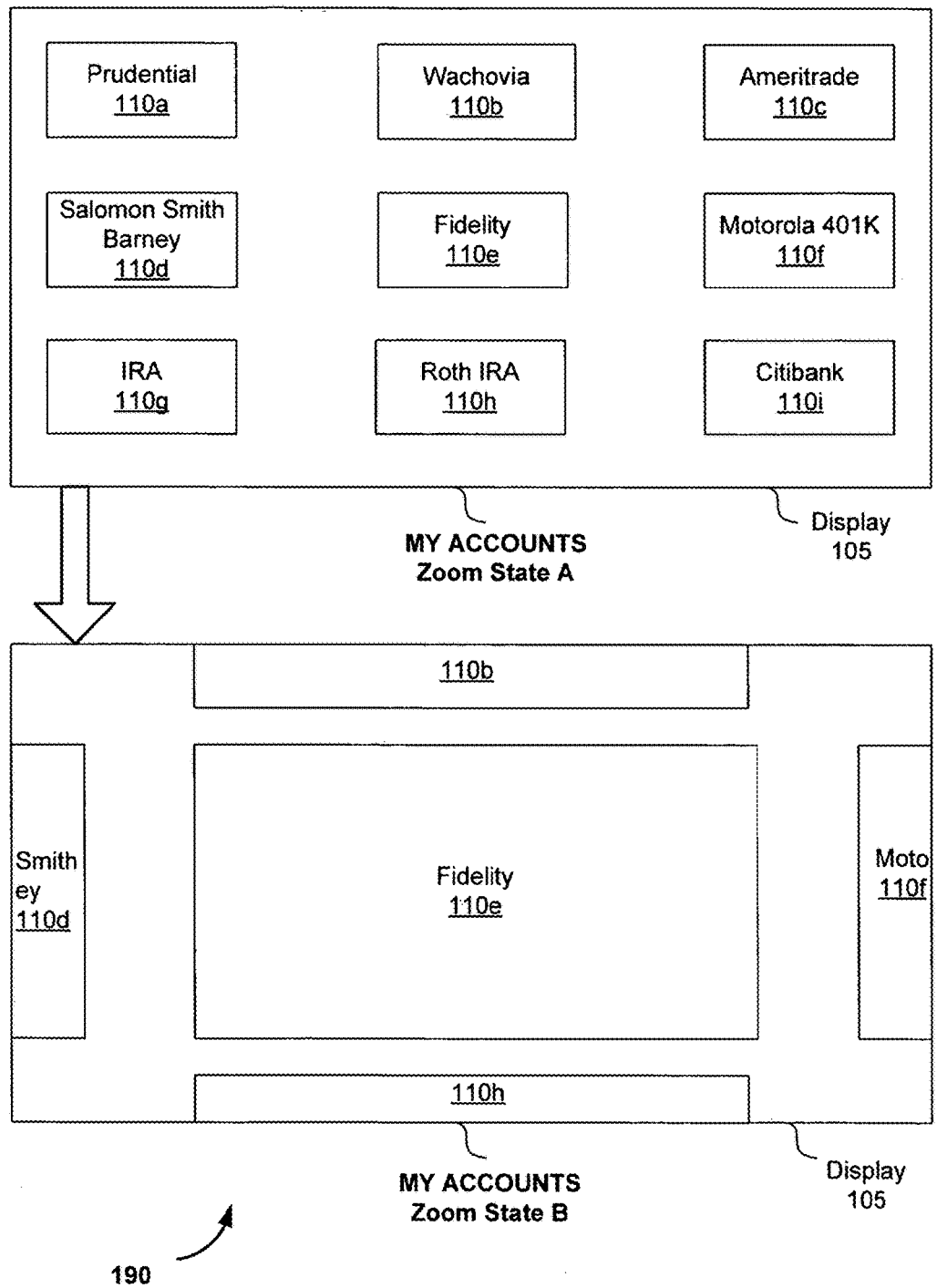
FIGS. 1A-1C illustrate navigation of a sample graphical user interface for a financial services application according to one embodiment.
Figure 1B:
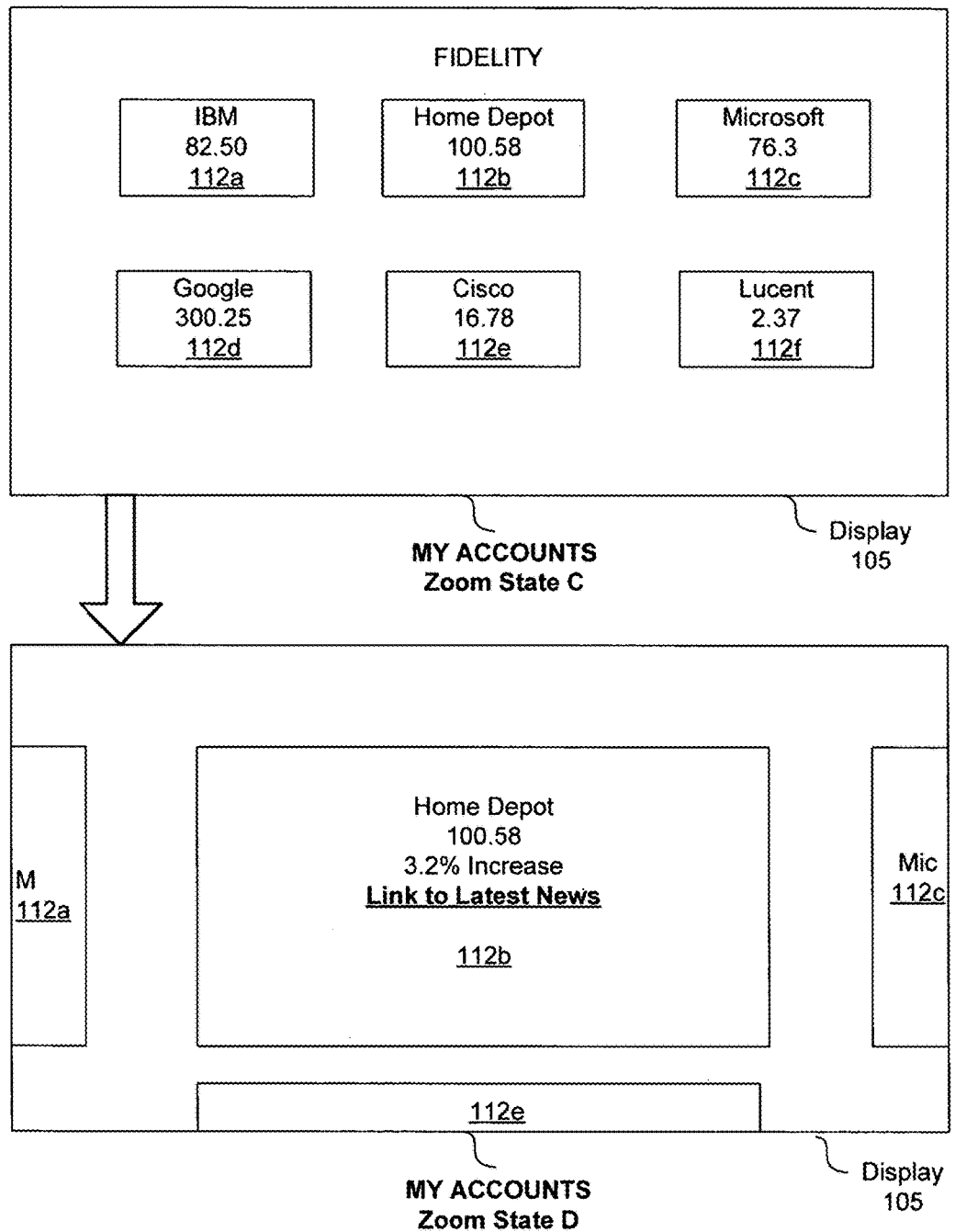
Figure 1C:
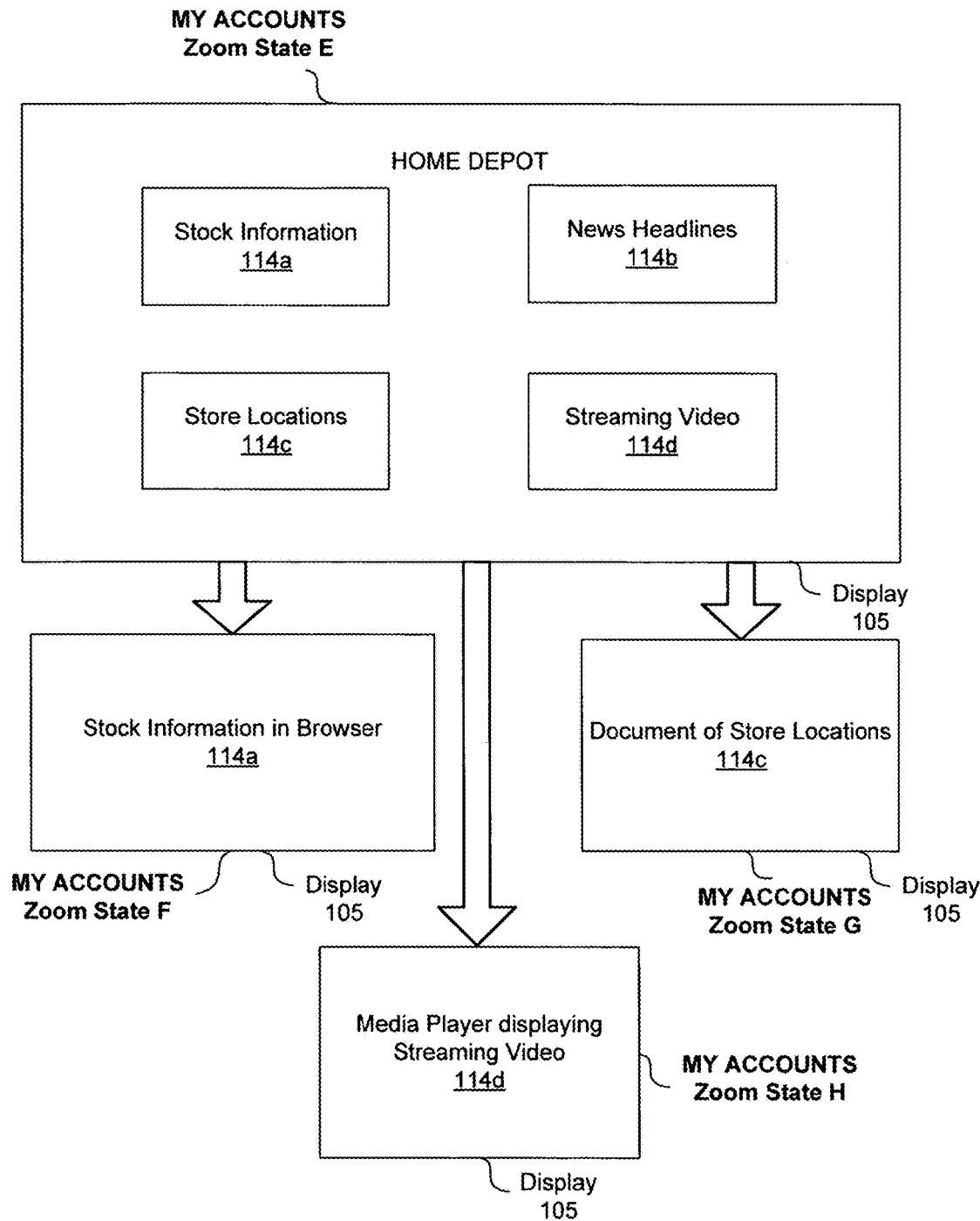

FIGS. 1A-1C illustrates navigation of a sample graphical user interface 190 for a financial services application according to one embodiment. The exemplary financial services application shown in FIGS. 1A-1C facilitates stock analysis by organizing a user's financial accounts in cells arranged geometrically in a cellular environment. The cellular environment is illustrated in Flat Navigation Mode. Each financial account comprises various financial assets such as stocks, bonds and mutual funds. Users can navigate the cellular environment to obtain various types of information about each account, such as performance and analysis data for underlying financial assets.

At a higher-level zoom state, such as zoom state A, the graphical user interface 190 shows cells 110 representing a user's various financial accounts. Visual representations outputted via the cells 110 at zoom state A provide information such as the name of each account, e.g. Motorola 401K cell 110*f*, the type of account, e.g. IRA cell 110*g*, or the name of the institution servicing the account, e.g. Prudential cell 110*a*. Cells 110 at zoom state A can also provide other types of information to a user. For example, at zoom state A, the Fidelity cell 110*e* can provide the text "FIDELITY" along with a logo of Fidelity and a link to the Fidelity website, thereby providing three different types of information, including text, an image and a hyperlink in a cell 110*e* at zoom state A. A user may choose to focus on a particular financial account such as Fidelity cell 110*e*. Upon zooming in to zoom state B, Fidelity cell 110*e* occupies a larger portion of display 105, other cells such as Motorola cell 110*f* and Wachovia cell 110*b* are only partially seen, while still other cells such as Ameritrade cell 110*c* are no longer displayed. At zoom state B, the Fidelity cell 110*e* displays additional information about the user's Fidelity account, such as a video of Fidelity news, the current value of Fidelity holdings and contact information for a Fidelity broker. Note that the Fidelity cell 110*e* provides different types of information at different zoom states, displaying a text, image and hyperlink at zoom state A and displaying a video and text at zoom state B. Moreover, the information displayed at different zoom states may be obtained from different sources, such as websites, databases, or RSS feeds, and displayed via the cells 110 using different applications. For example, the hyperlink at zoom state A can be obtained from a website and displayed via a browser while the video at zoom state B can be obtained from a database and displayed using a media player. Alternatively, information displayed at different zoom states can be obtained from different underlying sources and displayed via the cells after conversion to a common format.

Referring to FIG. 1A, various types of images such as textual graphics, photographs, and charts can be displayed in a cell at various zoom states. Note that Fidelity cell 110*e* can provide a user with two different images at two different zoom states, for example a 16×16 pixel graphic of Fidelity's name is displayed at zoom state A and a 32×32 pixel logo of the company is displayed at zoom state B. The images at different zoom states are not just different resolution versions of a single underlying image or texture map. For example, images displayed in a cell at different zoom states can have different semantic density, with additional information being displayed as a user zooms in to the cell.

To monitor the performance of specific financial assets in the fidelity account, the user can further zoom in to Fidelity cell 110e. At zoom state C, information about each financial asset in the fidelity account is presented in a separate cell 112. For example, IBM cell 112a shows the current stock price of $82.50. Further, IBM cell 112a can be color-coded to indicate the change in stock price during the current trading session, with green indicating that the stock price has increased and red indicating that the stock price has decreased. At zoom state C a user can further zoom in to a particular financial asset to obtain additional information about the financial asset. For example, zoom state D shows the user zoomed in to Home Depot cell 112b, with IBM cell 112a, Cisco cell 112e and Microsoft cell 112c being only partially visible. At zoom state D, home depot cell 112b displays the current price of Home Depot stock "$100.58," and informs the user that Home Depot stock has increased 3.2% during the current trading session. At zoom state D, the user is also presented with a link to the latest news for Home Depot.

As shown in FIG. 1C, a user can further zoom into Home Depot cell 112b to obtain a group of cells 114 simultaneously presenting various types of information about Home Depot. At zoom state E, a user who zooms into Home Depot cell 112b is presented with four cells including stock information cell 114a, news headlines cell 114b, store locations cell 114c, and streaming video cell 114d. The information for each of these cells can be obtained from different sources such as financial websites, e.g. using RSS feeds, or from databases. According to one embodiment, at zoom state E information from various information objects and in various formats is being converted into a uniform format that may be outputted via cells. For example, stock information cell 114a includes a stock ticker for Home Depot stock and a chart comparing the performance of Home Depot with an index such as the Dow Jones Industrial Average or with competitors such as ACE Hardware. Example streaming video cell 114d includes recent news stories about Home Depot or analyst reports on trends in the home improvement sector.

In addition to presenting users with various types of content from different data sources, cell can provide users with access to the full capabilities of native applications for interacting with these data sources. Referring to zoom state F, if stock information displayed in cell 114a is retrieved from a website, a user can zoom in to stock information cell 114a to invoke a browser for accessing the website. Referring to zoom state G, by zooming in to store locations cell 114c, a user may access and update a document of Home Depot store locations via an instance of a word processing application executing in the cell. Referring to zoom state H, zooming in to streaming video cell 114d invokes a media player for accessing the video. Note that FIG. 1C illustrates one embodiment of the present invention in which native applications such as a browser in zoom state F occupy the entire screen area of display 105. Alternatively, an application invoked in a cell can be displayed on a limited portion of display 105 alongside numerous other cells simultaneously displaying various other types of content.

Figure 1D:
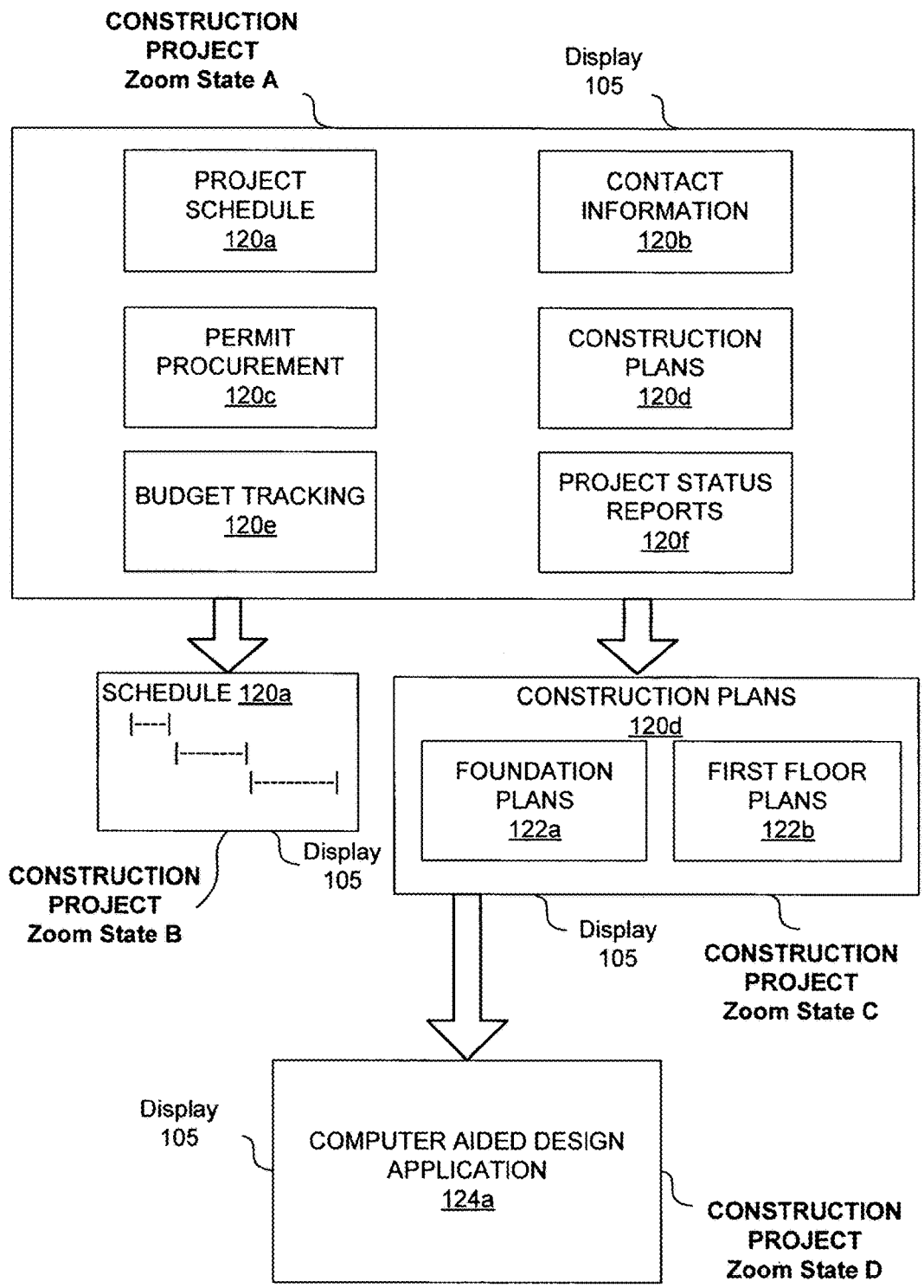
FIG. 1D illustrates navigation of a sample graphical user interface for a construction project application according to one embodiment.

FIG. 1D illustrates navigation of a sample graphical user interface for a construction project application according to one embodiment. The exemplary construction project application shown in FIG. 1D facilitates management of a construction project by organizing project-related information in cells arranged geometrically in a cellular environment. The cellular environment is illustrated in Flat Navigation Mode. Users can navigate the cellular environment to manage information about various aspects of the construction project.

At a higher-level zoom state, such as zoom state A, display 105 shows cells 120 representing various aspects of a construction project, such as a project schedule cell 120a, contact information cell 120b, which outputs contact information for each subcontractor, permit procurement cell 120c which tracks permits that are being procured, construction plans cell 120d, budget tracking cell 120e and project status reports cell 120f. Visual representations outputted via the high-level cells 120 can summarize key information for quick managerial review. For example, project schedule cell 120a includes an indicator of whether the project is on schedule as well as the next approaching milestone. To provide another example, permit procurement cell 120c turns green to indicate that all required permits have been procured. As yet another example, budget tracking cell 120e can indicate the total expenditure on the project to date.

The orientation and zoom state of the cellular environment may change in response to user navigation, e.g. when a user chooses to focus on a particular type of information such as project schedule cell 120a. Referring to zoom state B, by zooming in to project schedule cell 120a, a user may access and update the construction project's schedule via an instance of a project management application executing in the cell. Referring to zoom state C, a user zooms in to construction plans cell 120d to obtain foundation plans cell 122a and first floor plans cell 122b. By further zooming in to one of these plans, at zoom state D a user can invoke a computer aided design application 124a for accessing the plan. Alternatively, the cellular environment may change its orientation and zoom state in response to a change in underlying information. For example, when a status report for the project is updated by a user remote from display 105, the cellular environment outputted via display 105 can change its orientation and zoom in to project status reports cell 120f, thereby focusing a local user's attention on the updated report.

Figure 1E:
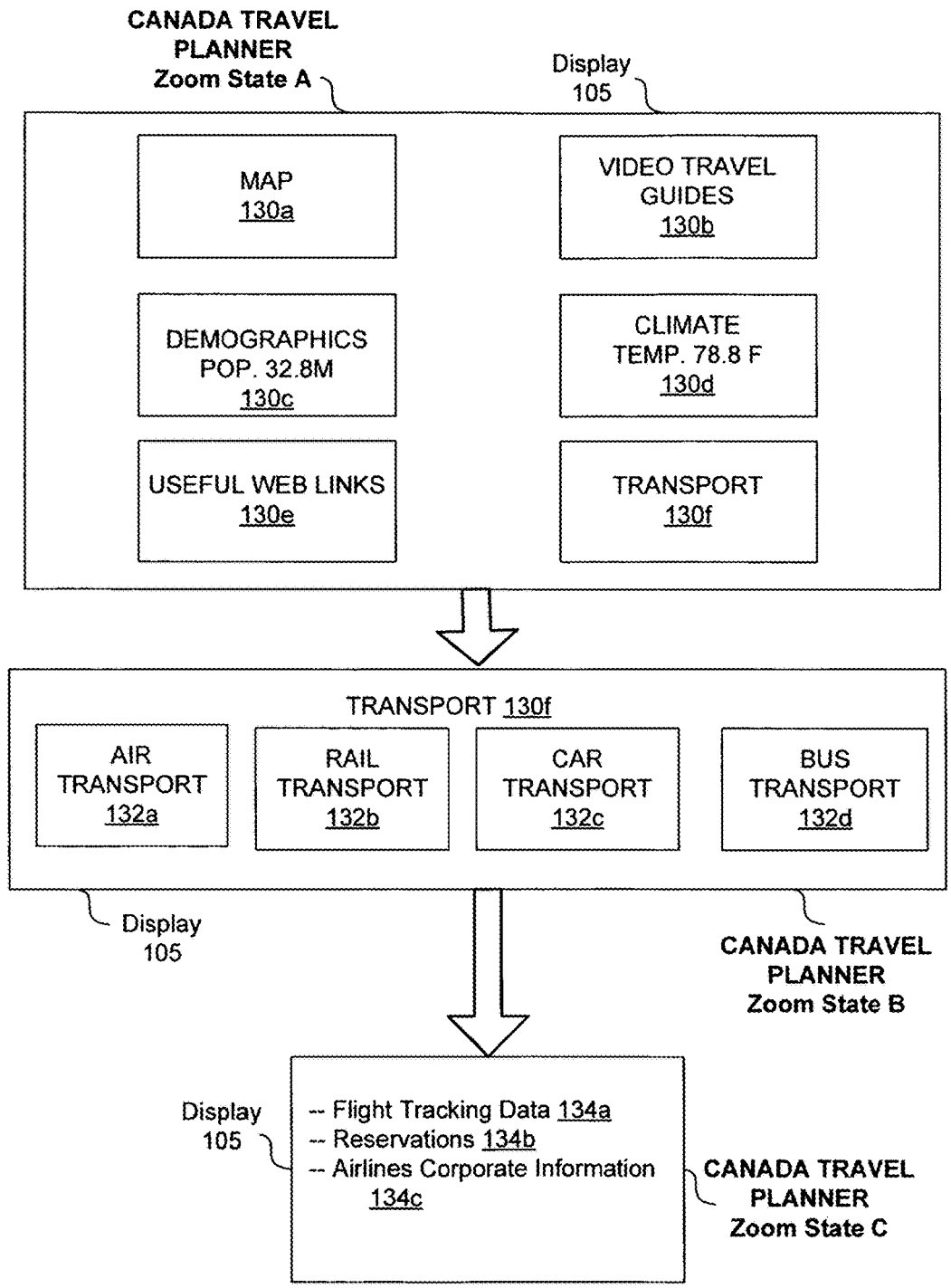
FIG. 1E illustrates navigation of a sample graphical user interface for a travel planner application according to one embodiment.

FIG. 1E illustrates navigation of a sample graphical user interface for a Canadian Travel Planner application according to one embodiment. The exemplary travel planner application shown in FIG. 1E facilitates travel planning by organizing travel-related information in cells arranged geometrically in a cellular environment. The cellular environment is illustrated in Flat Navigation Mode. Users can navigate the cellular environment to obtain various types of travel-related information.

At a higher-level zoom state, such as zoom state A, display 105 shows cells 130 representing various categories of travel information, such as map cell 130a showing a map of Canada, video travel guides cell 130b outputting video travel guides for various regions of Canada, demographics cell 130c, climate cell 130d, useful web links cell 130e outputting useful web links for planning Canadian travel, and transport cell 130f providing information about transport in Canada. High-level cells 130 can highlight key information for the relevant category. For example, demographics cell 130c provides the current population of Canada while climate cell 130 indicates the average high temperature during a chosen travel month. To provide another example, map cell 130*a* provides a thumbnail of the globe with the location of Canada highlighted.

The cellular user interface of the Canadian Travel Planner is capable of integrating various types of information from multiple sources and outputting the information via different media types. Referring to zoom state B, by zooming in to transport cell 130*f*, a user is presented with cells 132 for various modes of transport, such as air transport cell 132*a*, rail transport cell 132*b*, car transport cell 132*c* and bus transport cell 132*d*. As shown in zoom state C, air travel information can be obtained by zooming in to a cell for air transport 132*a*. At zoom state C, the user is provided with one or more cells displaying information about flight tracking in cell 134*a*, reservations in cell 134*b* and airline corporate information in cell 134*c*. Air transport cells 134 can harness information from different sources and simultaneously output the information using different applications or media types. For example, flight tracking data in cell 134*a* is obtained from a GPS system and outputted using a Microsoft Excel Spreadsheet. While viewing flight tracking data in cell 134*a*, a user is simultaneously presented with reservation information from a website in another cell 134*b*, as well as corporate information for airlines with service to Canada in a third cell 134*c*.

Cell Architecture and Function

Figure 2:
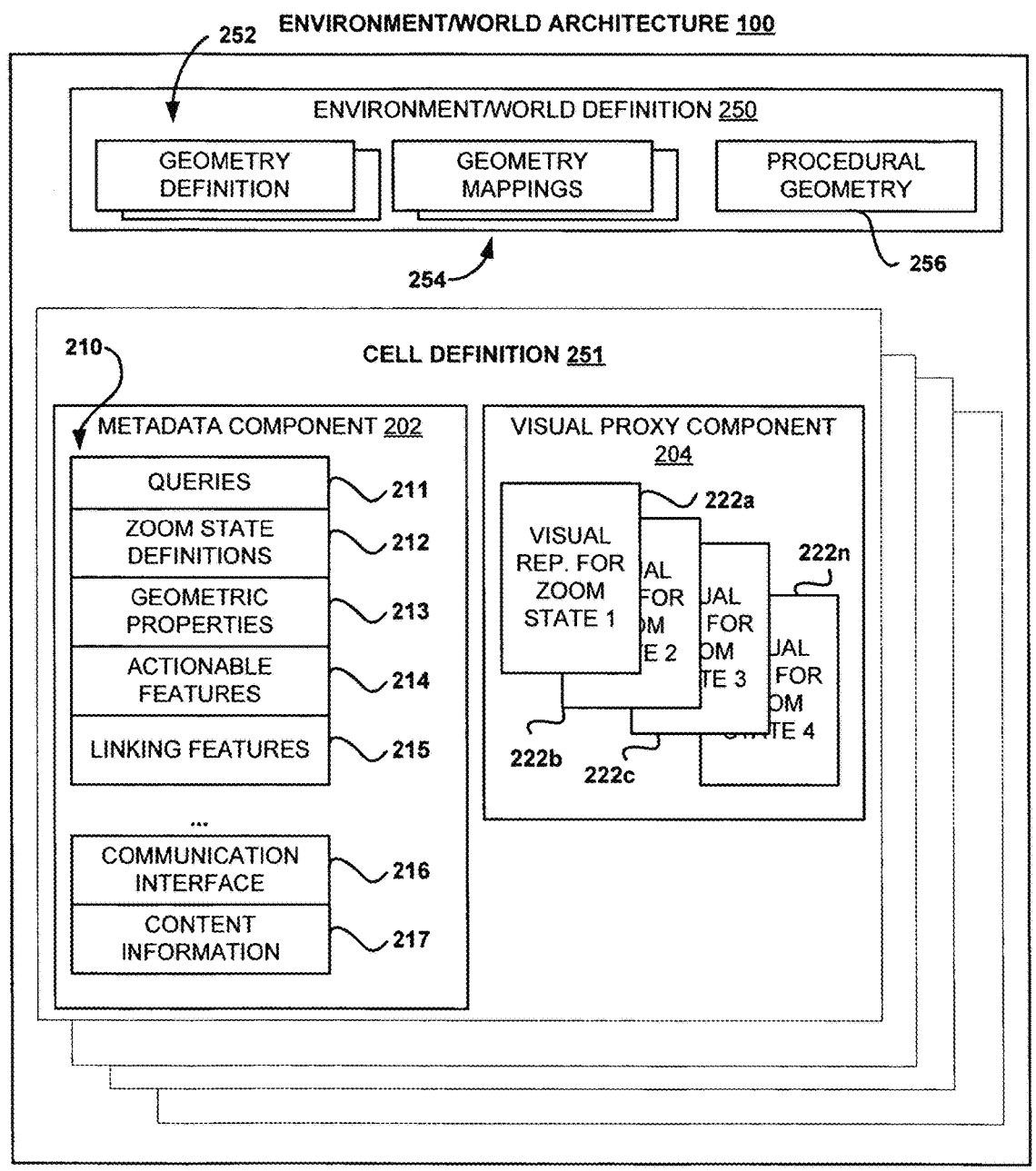
FIG. 2 is a block diagram illustrating a cellularized environment architecture and its associated cell architecture according to one embodiment.

FIG. 2 is a block diagram illustrating the software architecture for a cellularized environment 100, including environment definition 250 and cell definition 251. In one embodiment, the cell definition 251 includes a metadata component 202 and a visual proxy component 204. The software architecture for a cellularized environment 100, including cell definition 251, is described in related U.S. patent application Ser. No. 11/281,043, entitled "Cellular User Interface," referenced above.

There are two general types of tags, world data tags and cell data tags. World data tags define environment attributes associated with a cellular environment, including geometry definitions 252, geometry mappings 254, and procedural geometry 256. The world definition may also include additional environment attributes, such as present views, functionality, and the like. A cellular environment is associated with one or more geometry definitions 252 for representing the cellular environment in different navigation modes, such as flat navigation mode, spherical navigation mode, and cubical navigation mode. Each geometry definition 252 can specify the arrangement of cells in the cellular environment at a particular zoom state for a particular navigation mode. Each geometry definition 252 can also specify which cells arranged in the cellular environment are visible at the indicated zoom state. Geometry mappings 254 provide for conversion of a cellular environment between various navigation modes.

Referring to cell definition 251, the visual proxy component 204 includes one or more visual representations 222 associated with zoom states for one or more cells. The visual representations 222 are the visually displayed content of the cells in a cellularized user interface. One or more visual representations 222 at each zoom state provide simultaneous access to content from various underlying information objects. Further, zooming allows navigation between different visual representations 222 for a cell at different zoom states. The one or more visual representations 222 at a zoom state may be displayed via one or more cells.

The number of zoom states associated with a cell or a group of cells may vary based on the type of information being outputted. For example, a particular type of information such as current news stories for a company is displayed via one or more visual representations 222*a* at a single zoom state, while additional zoom states are provided for other types of information such as information about a company's stock. Generally, the visual representations 222 of a cell at its various zoom states are related to each other based on the content they represent. For example, the information associated with different visual representations 222 may include logically-related information, a common underlying topic or a common output mode such as video or audio.

The one or more visual representations 222 at various zoom states may be grouped together by a content designer using a Content Development Kit (CDK) 314, by a user based on user defined criteria such as information related to a particular topic, or by content events algorithmically related to the logical relationships of the information associated with the cell. The visual representations 222 for a given cell may be grouped by providing a cell definition with associations to the various visual representations 222. These visual representations can be expressed, for example, with an XML tag with a set of associated parameters. The values for the associated parameters would identify resources or visual representations 222 that can be set by the CDK or dynamically modified based on user or content events.

In addition to the visual proxy component 204, the cell definition 251 includes a metadata component 202. The metadata component 202 includes a plurality of cell feature definitions 210, also known as cell attributes. In one embodiment, the cell feature definitions 210 can be created or modified dynamically. A sample set of cell feature definitions 210 is shown by way of example in FIG. 2. Fewer or additional cell feature definitions 210 may be included in the metadata component 202 depending on the cellularized environment design. The metadata component 202 may be generated by a content designer through a CDK 314. Alternatively, a template of the metadata component 202 may be provided in a cell generation stencil. The stencil includes templates for multiple cells. In generating cells, copies of the templates are populated with data from associated data sources as indicated in configuration files. Visual proxy components 204 are similarly generated from templates or otherwise directly from the data as indicated in the configuration and stencil files.

The content at each zoom state may be arranged according to a template. One type of template is a static template, which predefines a specific arrangement of cells. For example, static templates can be created by positioning cells manually using a CDK 314. Another type of template is a dynamic template, which is built dynamically through queries to a database at client 302 or to cellular database 406 at content server 410. Dynamic templates can be created at run-time by using computer algorithms (e.g. layout algorithms) to sort, group and position cells based on their metadata. The arrangement of cells in a dynamic template is based, for example, on contextual relationships between cells or the priority of information in cells, wherein the contextual relationships or priority is specified by metadata associated with the cells.

The metadata component 202 includes a query feature definition 211, zoom state definitions 212, a geometric properties feature definition 213, an actionable feature definition 214, a linking feature definition 215, a communication interface feature definition 216, and a content information feature definition 217, among other feature definitions 210.

The query feature definition 211 and the zoom state definitions 212 are described below. Metadata component 202 is further described in related U.S. patent application Ser. No. 11/281,043, entitled "Cellular User Interface," referenced above.

The query feature definition 211 specifies one or more queries associated with the cell. Different queries can be provided for different zoom states of a cell or a group of cells. The query definitions 211 can be used as a source query for requesting additional information in response to a user action. The query definitions 211 can also be used to establish relationships with other cells or to interact with display features of the cellular environment 100. For example, in a financial data cellularized environment 100, a cell query definition 211 in a first cell 101a may respond to a user selection of the cell 101a by selecting via the query a set of cells 101 (or subcells) with information related a business entity represented by the cell 101a. The selected set of subcells includes a current stock price subcell, a current news subcell, a latest corporate filings subcell, and the like; each of these would take their data from respective data sources and applications.

Zoom state definitions 212 provide instructions to a viewer application for associating the zoom state of a cell with cell behavior. The instructions specify which visual representations 222 to display based on the zoom state at which the cell is being displayed. Zoom state definitions 212 include content references associated with one or more zoom states for a cell or a group of cells. Each content reference provides a reference to content associated with a zoom state, including one or more visual representations for the zoom state. A content reference provides references to content from one or more information objects. Further, a content reference associated with a zoom state may provide references to content in different formats, or to content accessible via different media types. In an exemplary financial services application, a content reference associated with a cell can provide references to a database of stock prices as well as to streaming audio of news analysis for the stock.

TABLE A

ZOOM STATE DEFINITIONS 212

| Zoom State 1 | Content Reference for Zoom State 1 |
|---|---|
| Zoom State 2 | Content Reference for Zoom State 2 |
| ... | ... |
| Zoom State n | Content Reference for Zoom State n |

Table A illustrates content references associated with various zoom states for a cell or a group of cells according to one embodiment. Each zoom state for a cell or a group of cells is associated with a content reference. The content reference for an exemplary zoom state n provides a reference to content associated with zoom state n, wherein the content associated with zoom state n includes the one or more visual representations 222n. A viewer application is capable of resolving these content references to retrieve and display underlying visual representations. Resolving the content reference may include a fetch request or a query request to retrieve content associated with the content reference.

One embodiment of the present invention allows users to navigate successive zoom states associated with a cell or a group of cells to obtain content that is arranged hierarchically. To enable hierarchical organization of content, content references associated with a cell or a group of cells can comprise queries to be executed at successive zoom states. Arranging content hierarchically in successive zoom states allows a cell or a group of cells to be associated with a large volume of information that can scale to accommodate new content. Further, hierarchical arrangement of content allows content architects to define content structures without knowing the specific volume or type of content. For example, a cell position in a dynamic template may reference a group of cells outputted by a sorting or grouping algorithm, wherein the content architect need not know the number of cells referenced or the type of content in each cell.

Cells can also be arranged in groups by sorting and grouping algorithms. Sorting and grouping algorithms sort cells and arrange them in groups based on content information 217, which specifies the metadata or type of content associated with a cell or a group of cells. Groups of cells can also be arranged hierarchically based on their content or metadata. When arranging the groups of cells in a template, layout algorithms can be used to arrange cells in the same group in proximity to each other.

An exemplary content reference associated with a zoom state of a cell can include one or more of the following types of references:
- a reference to a file, such as the path of the file on client 302 or on a network
- a reference to an image, such as the path of the image on client 302 or on a network
- a reference to a RSS feed,
- a reference to an audio or video file or to a streaming audio or video feed
- a reference to an application invoked at the zoom state, such as command for executing the application, or
- a reference to an applet, script or other executable.

Another exemplary content reference comprises a reference to a website or a portion of a website (URL) which may be accompanied by metadata used to extract relevant information from the website. Another exemplary content reference comprises a reference to a bitmap image of a website or document, wherein the bitmap image can be displayed on an arbitrarily shaped two-dimensional or three-dimensional area on a screen, such as a portion of a sphere. Coordinates on the bitmap image are mapped to positions on the website or document. When a cell displays a bitmap image of a website, a user's click on the bitmap image can be mapped to a corresponding hyperlink on the website and the cell is updated to display the content specified by the hyperlink.

Another exemplary content reference associated with a zoom state provides a reference to one or more cells. A user can zoom in to a group of cells at an inner zoom state, wherein the group of cells at the inner zoom state are arranged geometrically in the cellular environment. FIG. 1A illustrates an example cell 110e displaying information about a Fidelity portfolio at an outer zoom state B, which is associated with a group of six cells 112 displaying information about individual stocks in the portfolio an inner zoom state C in FIG. 1B. For example, a group of cells at an inner zoom state can display several charts associated with a company's stock performance. At an outer zoom state, the group of cells can be replaced by a single cell displaying the most important chart associated with the company's stock.

Referring to Table A, the content reference for zoom state n may provide a reference to one or more cells that display the one or more visual representations 222n at zoom state n. Further, resolving the content reference for zoom state n comprises retrieving the content to be outputted via the one or more cells at zoom state n. The one or more retrieved cells at zoom state n may contain data in different media types, such as images, videos, graphs, or audio, thereby allowing a user to zoom in to a particular type of content or a particular media type. The cellular content at a zoom state n may be cached at client 302, thereby increasing efficiency while navigating different zoom states at client 302, or alternatively it may be retrieved from content server 410 via a fetch or query request. Other exemplary content references include references to a channel of related cells or to an inner world of cellular content.

Still other content references for a zoom state comprise references to applications for interacting with underlying content. By zooming in to a zoom state, the user invokes a referenced application. For example, zooming in to a cell can invoke a web browser for interacting with a website or an application such as a word processing application for accessing a document. Therefore, the capabilities of native applications are available for interacting with underlying information objects. A further embodiment of the present invention simultaneously displays various types of information via a cell or a group of cells and allows a user to simultaneously interact with multiple native applications for accessing different information. For example, in a financial services application, a user may zoom in to a symbol of IBM stock to obtain a website for analysis of IBM stock as well as a video of market news.

Other exemplary references in a content reference include a reference to one or more templates, a reference to a group of visual representations 222 to be outputted at different zoom states, or a query.

As a general matter, the metadata component 202 and visual proxy component 204 of a cell can be made to depend on external inputs. The values for any of the parameters may be variables capable of changing and/or linked to external inputs. Cells that include these external dependencies are proactive cells. Proactive cells react to user actions and/or content events to update or modify their content. Proactive cells can periodically regenerate their content based on instructions in a cellular framework. For example, one or more cells in an environment 100 are associated with a data feed, e.g., Real Simple Syndication ("RSS") data feed, Atom Syndication Format ("Atom") data feed, or the like. Responsive to changes in the data feed, the cells dynamically regenerate their content and information to provide an updated result. The cell regeneration takes place as indicated in the assembly model or frameworks and may be modified based on user credentials to customize the resulting cellularized environment 100.

XML Implementation Embodiment

In one embodiment, the cellularized environment architecture may be implemented in XML. One example of an XML implementation includes a world description file with a .viz file extension, "the vizible file." The vizible file includes XML tags for the cellularized environment/world definition 250. These tags provide a set of variables that define properties of the cellularized environment or world 100. In general, there may be two general types of tags, world data tags and cell data tags. World data tags define the environment/world definitions 250, that is, the geometrical definitions 252, the geometry mappings 254, and procedural geometry 256 describing their interaction. The world definition may also include additional world properties, such as present views, channels, additional functionality, and the like. In one embodiment, the vizible XML file (".viz") includes the XML tags for the world 100.

In an XML implementation, the world 100 and cell 101 data may be provided in separate data files or in a single data file. For example, in a single .viz file world and cell tags may be nested as follows:

```
<world>
    [world data]
        <cell>
            [cell data]
        </cell>
        <cell>
            [cell data]
        </cell>
</world>
```

Moreover, multiple sets of definitional sections can be nested within each other, such that one or more "<world>[world data]</world>" definitions or "<cell>[cell data]</cell>" definitions can be included within a "[cell data]" section.

The "[world data]" includes variables and values defining the environment/word definition 250. The environment/world definition 250, in addition to the geometric related properties 252-256, includes instructions for a viewer to implement world related variables. These include an initial view position and zoom, color scheme, animations, global cell values, layouts, and the like. Layouts are defined as part of the geometry definition 252 of the environment. Implementation of layout definitions is further discussed below.

The "[cell data]" includes variables and values for the viewer to implement cell related display variables, e.g., visual proxy, cell size, and the like. Each cell is associated with "[cell data]" that provides to the viewer values for the variables defining properties of the cell. As further explained below, these variables and their values can be dynamically modified or updated based on user interactions and/or content events.

XML Implementation for World/Environment Definition

The following is an example of tags and associated parameters with data types for a [world data] section in a .viz XML world definition. In this example, tags are shown with their corresponding value type indicated as [int] for integers, [dec] for decimal numbers, [Boolean] for true/false values, [str] for textual string, and [defined] for a defined value.

```
<world id=[str] init zoom="[defined]" flat_view="[Boolean]"
    layout="[int]" quickview="[int]"/>
    <colors node_transparency="[Boolean]"><activation= ...>
    ...</colors>
    <geometry type="[defined]" number_rows="[int]"
        number_columns="[int]">
    ...
    </geometry>
    <navigation>
        <singleclick show_channels="[Boolean]"
            show_groups="[Boolean]"/>
        <layouts>
            <layout key="[int]" name="[string]"
                movement="[defined]" background="[Boolean]"
    inert="[Boolean]" caps="[Boolean]" frames="[Boolean]"
    background_shape="[defined]">
                <manipulator />
                <cell id/>
                ...
```

```
        <cell id/>
    </layout>
    ...
    </layouts>
</navigation>
```

The [world data] section is demarked by the <world/> tags. The <world/> tag itself includes various parameters to identify the world and to define the initial display of the world to the client application 104 at start up, e.g., initial zoom state, whether the world is a flat or 3-D geometry, what initial layout to show, and the like.

The section demarked by the <colors/> tags defines activation, selection, background, and highlighting colors to be used as default for all the cells in the world. These values may be modified with local assignments at the cell definition level.

The section demarked by the <geometry/> tags defines general geometry properties such as the type, e.g., spherical, number of rows and columns, default cell sizes, depth, aspect ratios, spacing, background and the like. This is one implementation of a geometry definition 252.

The section demarked by the tags defines the navigation available to the user through the client viewer 104. For example, it defines a response to a single click of a mouse to show a channel or a group. It defines several layouts available to display in response to mouse "movement" as defined by the <layout/> tags. Each layout may include a definition for what cells it includes as shown by the <cell/> tags.

The <zoom/> tag includes various parameters to set responses to zoom state variations, e.g., activation, selection, surfing, swap_in, and swap_out.

For example, in one embodiment XML for [world data] making up an environment definition 250 includes the following:

```
<world init zoom="additional_zoom_1" flat_view="true" index="144" layout="1"
quickview="-1"/>
    <colors node_transparency="true">
        <activation red="255" green="255" blue="255" alpha="255"/>
        <background_color red="255" green="255" blue="255" alpha="255"/>
        <highlight red="255" green="255" blue="0" alpha="255"/>
        <selection red="200" green="5" blue="5" alpha="255"/>
    </colors>
    <animations clump="true"/>
    <geometry type="dashboard" number_rows="42" number_columns="17">
        <cells visible_when_collapsed="0" horizontal_spacing="0.005263"
            generated="true" proportional_rows="0" height="0.040000"
            width="0.140000" vertical_spacing="0.010000"/>
        <background generated="false" depth="-0.040404" height="0.745455"
            radius="0.990000" width="0.987273"
            reverse_outer_background="false"/>
        <caps height="0.262245" generated="false"/>
        <frames generated="true" height="0.002500" width="0.002500"/>
        <inert generated=""/>
    </geometry>
    <navigation>
        <misc_navigation ignore_transparent_pick="false" spin_speed="7"/>
        <mouse drag_panning="true" drag_zoom="true"/>
        <layout .../>
    </navigation>
        <zoom additional_1="7" keyboard_min="0.74" activation="0.121000"
            selection="0.303000" surfing="3.000000" swap_in="0.0" swap_out="1"
            snap_to_levels="false"/>
</world>
```

-continued

```
    <zoom activation="[dec]" selection="[dec]" surfing="[dec]"
        swap_in="[dec]"
        swap_out="[dec]"/>
    </world>
```

Layouts

The XML implementation of a world definition 250 may also include pre-defined layouts as part of its geometry definitions 252. For example, a layout for a spherical environment can be specified in XML as follows:

```
<layouts>
    <layout key="21" name="Layout 21" movement="pan"
    background="true" inert="true" caps="true" frames="true"
    background_shape="flat">
        <manipulator qx="0.000000" qy="1.000000" qz="0.000000"
        qw="0.000000" tx="446.035919" ty="446.492401"
        tz="443.167267"/>
        <cell id="10" row="0" col="10" qx="0.000000" qy="0.000000"
        qz="0.000000" qw="1.000000" tx="-0.375305" ty="-0.112244"
        tz="0.025970" sx="0.500000" sy="0.375000" show="true"
        morph="6"/>
        <cell id="103" row="6" col="1" qx="0.000000" qy="0.000000"
        qz="0.000000" qw="1.000000" tx="-0.496613" ty="0.115356"
        tz="0.000000" sx="0.270000" sy="0.054643" show="true"
        morph="6"/>
</layout>
```

Layouts may include fixed layouts and algorithmic layouts. For example, an XML implementation of a world definition 250 with fixed and algorithmic layouts includes the following tags:

```xml
<?xml version="1.0"?>
<world id="WorldHello" name="theworld" theme="some theme"
active="Layout1">
    <layouts>
        <fixedLayout id="layout1" is2d="True"
        environment="http://env/geometry">
            <frame id="frame1" ref="#cell1">
            <listener event="onlevelofdetailchange"
            handler="changeResource( )"/>
            <position x="434" y="768" width="400" height="800"/>
            </frame>
            <frame id="frameN"...
        </fixedLayout>
        <sphere id="layout2" is2d="False"
        environment="http://env/sphere">>
            <frame id="frame1" ref="#cell1"/>
            <frame id="frameN"...
        </sphere>
    </layouts>
    <cell> [cell data] </cell>
    ...
</world>
```

The <fixedLayout\> tag defines a static layout with the position of each frame in the world as given by the "geometry" definition located at http://env/geometry. The first frame at coordinates x=434, y=768, at a camera view or height of 800. This layout is implemented upon detecting a "change of level of detail" or zoom state change. The change in layout is accomplished through the functions "changeResource( )" specified as handler.

By contrast, the <sphere/> tag defines an algorithmic layout that positions frames automatically over a spherical geometry located at http://env/sphere. Each frame is specified by the <frame/> tags and associated parameters.

XML Implementation of Cell Definitions

For illustration purposes, a simplified cell architecture according to one embodiment is shown below. This XML example is a section of a vizible file corresponding to a single cell definition. For each cell in the world or environment, additional similar sections would be used.

```
<cell row="[int]" col="[int]" depth="[int]" id="[int]"
type="[defined]" locked="[Boolean]"
live="[Boolean]" version="[dec]">
    <activation type="[defined]" url="[str]"/>
    <passive>
        <visual first_filename="[str]" first_media_id="[defined]"
        second_filename="[str]" second_media_id="[defined]"
        aspect_ratio="[dec]"/>
    </passive>
</cell>
```

In this example, the cell metadata component 202 includes a geometric properties definition 213 that defines the cell's depth and location in the world's geometry by row and column. The cell's zoom state definitions 212 and associated visual representations 222 are defined in the <passive> section with two potential zoom states. In the cell's zoom state definitions 212, the content reference for zoom state 1 includes a visual "first_filename" parameter with a corresponding string ("[str]") value to specify the path and file name for the visual representations 222a associated with zoom state 1. Resolving the content reference for zoom state 1 comprises determining the path and file name for the visual representations 222a associated with zoom state 1. Similarly, the content reference for zoom state 2 includes a visual "second_filename" parameter with a corresponding string ("[str]") value to specify the path and file name for the visual representation 222b associated with zoom state 2. One skilled in the art will recognize that zoom state definitions 212 can include additional content references associated with additional zoom states for a cell. Further, a content reference can include other types of references, such as a reference to a video file in a remote database, a reference to an RSS feed, and a reference to a portion of a website. The actionable feature definition 214 is specified by the "activation type" tag and the associated universal resource locator "url" tag. The content information 217 in this embodiment is a simplified version in which a content type is specified with the "type" and "media_id" tags and associated defined values of several possible defined values, e.g., movie, image, textual, and the like. In the example XML above, the set of tags used are simply for illustration purposes. Additional or different tags may be used to define any combination of cell attributes 210 for a cell metadata component 202 and associated visual proxy component 204.

An example of a cell definition component with actual values for the various parameters is shown below:

```
<cell row="41" col="10" depth="0" id="0" type="standard"
locked="true" live="false"
    version="0">
    <activation type="" url=""/>
    <passive>
        <visual filename="viz.gif" media_id="001"
        alt_filename="" alt_media_id=""/>
    </passive>
</cell>
```

In this example, the cell 101 is part of a "dashboard" type environment and is located at row 41 column 10 of the dashboard environment. The cell type (type=) is "standard" and it is "locked" (locked="true") in its position so that the user cannot alter the cell location during display. As further discussed below, the "live" feature is not active for this cell indicated by the "false" value. Multiple cell versions can be combined within an environment. Therefore a cell version parameter (version=) is provided and it indicates that this cell is version "0." An activation response could also be provided through the <activation/> tag. For this tag there are two parameters, a type of activation (type=) to indicate what occurs when a user activates the cell, e.g., clicks on the cell, and if the activation type was "hyperlink," then another parameter is provided to indicate the URL of an html page to display (url=). For this cell, there is no activation specified. The visual representation for this cell is passive and includes a file "viz.gif" that will be displayed within the cell. A file media_id of 001 indicates that this file is an image. An alternative file name could be provided as a value to the parameter alt_filemname with corresponding media id but in this case no alternative is provided.

The complexity of the cell definition 251 can vary greatly depending on the purpose of the environment and of each cell within the environment. A slightly more complex and content rich cell definition section 251 includes tags and parameters for its various feature definitions in its metadata component 202 and for its visual proxy component 204 it includes tags for identification of resources for its various zoom state level proxy components 222. A sample XML tag set of a cell definition sections is shown below:

```
<cell>
  ...
  <metadata>
    ...
    <content>
      <title> "Spiderman 2"</title>
      <type media=movie> "action" "fantasy" "sci-fi" </type>
      <names nameof=actors> "Tobey Maguire" "Kirsten Dunst"
        "James Franco" "Alfred Molina"</names>
      <outline> "Peter Parker has personal problems to deal with
        while Spider-Man confronts Dr. Otto Octavius, who
        has been transformed into Doctor Octopus, a multi-
        tentacled villain" </outline>
      <query1> "movie" </query1>
      <query2> "entertainment"</query2>
    </content>
  </metadata>
</cell>
```

As shown above, the content information feature definition 217 of a cell 101 may include information upon which queries can be performed, e.g., title, media type, names of relevant persons (e.g., actors, authors, directors, employees, employers, corporate officers, and the like), outline of the content represented by the cell, and the like. In addition, query specific fields, e.g., <query1>, can provide a reference for fast query execution based on predefined parameters, e.g., media type, content type, or the like. For example, a channel organization function may execute a query over a query specific field, e.g., <query 1>, to organize cells based on the type of information they display using this feature of the cell metadata component 202.

Similarly, additional purpose specific keywords or tags may be included to enable content display enhancement and features, such as, dynamic filtering (e.g., query based filtering and presentation), contextual presentation (e.g., provide media player menus when displaying a cell type "movie" or "audio file"), 360-degree views of particular content of interest to the user (e.g., presenting related more in depth content upon user interest indication), and the like. Thus, the metadata content information feature definition 217 advantageously enables intelligent content presentation to users.

The complexity of the visual proxy component 204 is also variable. The following example illustrates the visual proxy component 204 and zoom state definitions 212 for an example cell architecture with three zoom states:

```
<cell id="cell1" name="imagecell">
  <data name="name">value</data>
  <data name="name">value</data>
  <resources>
    <image id="image1" uri="image1.jpg" type="Texture"/>
    <image id="image2" uri="image2.jpg" type="Texture"/>
    <image id="image2" uri="image2.jpg" type="Texture"/>
  </resources>
  <zoom_states id="imagemixmap2">
    <levelimage level="512" src="image1"/>
    <levelimage level="256" src="image2"/>
    <levelimage level="128" src="image3"/>
  </zoom_states>
</cell>
```

In this example, the <resources/> tags demark the section defining the visual proxy component 204. Each <image> tag denotes a visual representation 222. The <image> tag includes an image id to identify the visual representation 222, a locator or uniform resource identifier ("uri") to specify a file and path name if necessary, and the type of visual representation. The <zoom states/> tags demark the zoom state definitions 212 section. For each zoom state, a <levelimage/> tag provides a resolution of the cell at the zoom state (e.g. level="128" indicates a resolution of 128× 128 pixels) and a content reference for the zoom state. For example, the content reference at zoom state 1 for the cell is src="image1", which specifies that image id "image1" is the visual representation 222*a* at zoom state 1. Similarly, the content reference at zoom state 2 for the cell is src="image2", which specifies that the image id "image2" is the visual representation 222*b* at zoom state 2.

The following example illustrates sample XML code for applying different images as textures to a graphic at different zoom states. Various characteristics of the graphic are specified at zoom states "1" and "2" shown below. At each zoom state, XML code within <label> tags specifies various parameters associated with the graphic at that zoom state. Example parameters associated with a graphic at a particular zoom state include a path to a background image applied to the graphic, a background color, width and height of an output image, and effects such as shadow, outline, engrave or emboss applied to the graphic.

```
<graphic>
  <graphic_layer zoom state="1">
    <label>
      <!--background image comments!-->
      <background_image absolute_path=""
        relative_path="\rtn_jpg\CVX.N_0_512.jpg"/>
      <source type="rtf" absolute_path="" relative_path=""
        level="2"
        background_color="0x00ff00ff"/>
      <output_image width="512" height="512"/>
      <effect shadow="no" outline="no" engrave="no"
        emboss="no"/>
    </label>
  </graphic_layer>
  <graphic_layer zoom state="2">
    <label cropped="true" cropX="0" cropY="0"
      cropWidth="0.3333" cropHeight="0.3333">
      <background_image absolute_path="" relative_path=""/>
      <source type="plaintext" text="This is a plain text label"
        font_size="14"
        font_color="0xff00ff" font_style="bold"
        align="center"
        background_color="0xffffff00"/>
      <output_image width="128" height="64"
        format="ddsdxt1"/>
      <effect shadow="no" outline="no" engrave="no"
        emboss="no"/>
    </label>
  </graphic_layer>
</graphic>
```

System Architecture

The system architecture according to one embodiment of the present invention shown in FIGS. 1 through 6 is explained in related U.S. patent application Ser. No. 11/281, 043, entitled "Cellular User Interface," referenced above.

Figure 7:
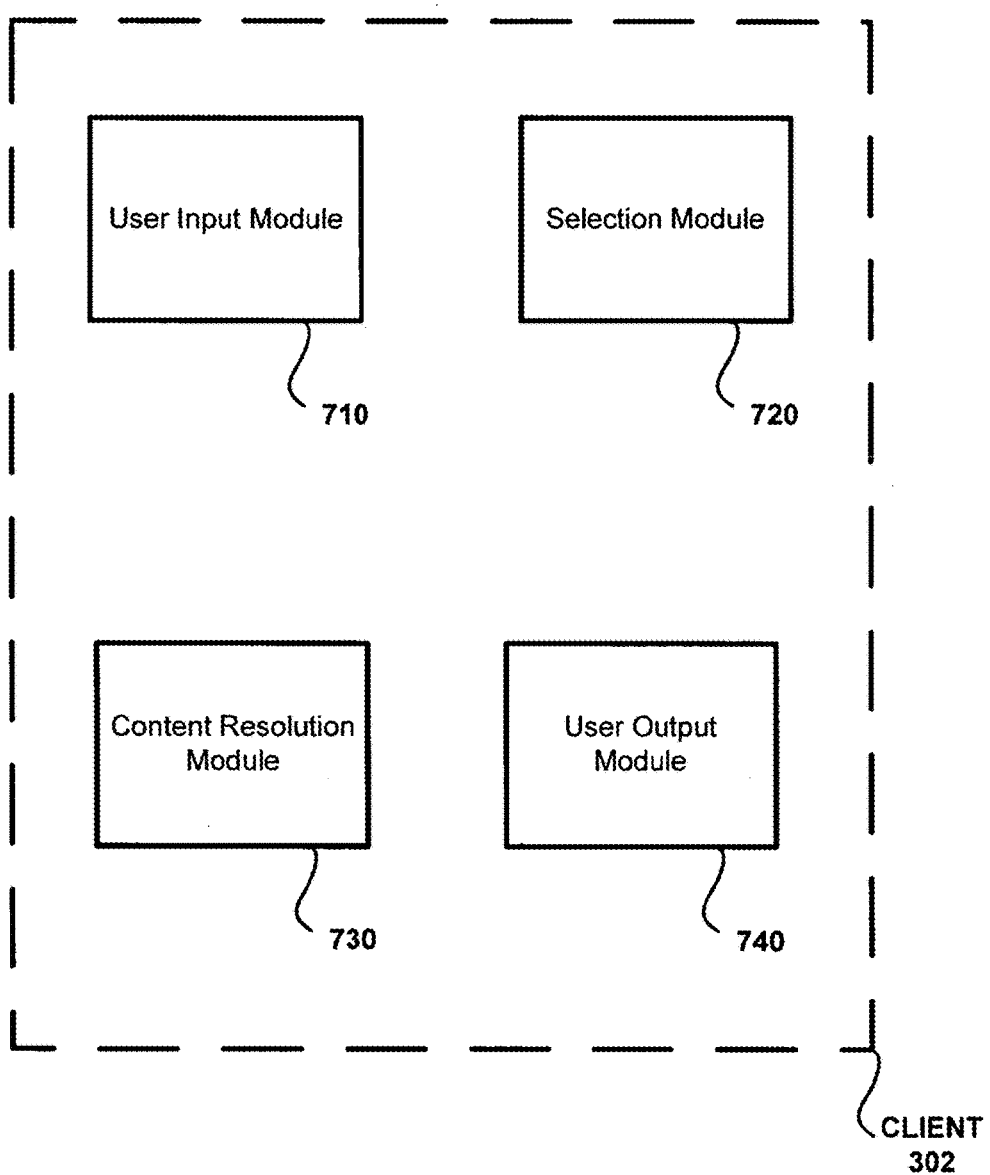
FIG. 7 is a block diagram illustrating modules in a client according to one embodiment.

Referring to FIG. 7, in one embodiment, client 302 includes a user input module 710, which receives an indication of a zoom state in the cellular environment. For example, a user may indicate a zoom state associated with the cellular environment by means of an input device such as a mouse or keyboard. Selection module 720, in communication with user input module 710, determines environment attributes associated with the cellular environment at the indicated zoom state, including the arrangement of cells in the cellular environment at the zoom state, and which cells arranged in the cellular environment are visible at the indicated zoom state. Selection module 720 also determines a content reference associated with one or more of the cells visible in the cellular environment at the zoom state. The content reference can be selected from a plurality of content references provided by zoom state definitions 212. Content resolution module 730, in communication with selection module 720, resolves the content reference to obtain content that includes a visual representation 222 associated with the zoom state. Client 302 also includes a user output module 740, in communication with content resolution module 730, which outputs the content via the cell.

Client 302 can also render a graphic in a non-cellular environment such as a video game interface. User input module 710 receives an indication of a zoom state associated with a graphic. Selection module 720, in communication with user input module 710, determines an image associated with the zoom state. Alternatively, selection module 720 selects a content reference associated with the zoom state and content resolution module 730 resolves the selected content reference to obtain an image associated with the zoom state. User output module 740 outputs the image as a texture for the graphic at the zoom state. During user navigation of multiple zoom states, user input module 710 receives indication of a first and second zoom state associated with a graphic, selection module 720 determines a first image associated with the first zoom state and a second image associated with the second zoom state, and user output module 740 outputs the first and second images as textures for the graphic at the first and second zoom states, respectively. Note that the first and second images may be independent of each other, thereby allowing a graphic to be represented by different visual representations at different zoom states.

Methodology for Navigating a Cellular Environment

Figure 8A:
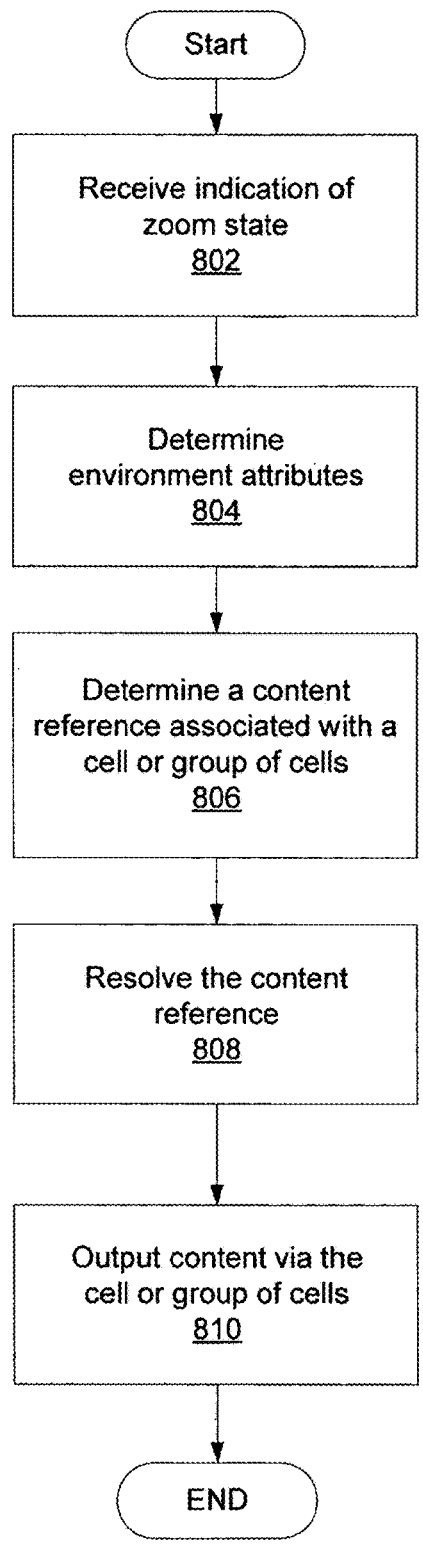
FIG. 8A is a flowchart of a method for retrieving and outputting content at a zoom state of a cellular environment according to one embodiment.

FIG. 8A is a flowchart of a method for retrieving and outputting content at a zoom state of a cellular environment according to one embodiment. The method starts by receiving 802 an indication of a zoom state in the cellular environment. In one embodiment, a user provides an indication of a zoom state by zooming in to a cell or a group of cells representing a particular type of information on which the user wants to focus. Note that a user can provide an indication of a zoom state through any type of user interface means, including via a touch screen, via buttons on a navigation bar, or via programmed keyboard or mouse manipulations. For example, a user can select a cell using a cursor and click on the cell to zoom in. To provide another example, a user can navigate between cells using arrow keys on a keyboard and by hitting the "Esc" key to zoom out. To provide yet another example, a user can indicate a change in zoom state by re-sizing a window in which a cellular environment is being displayed, or by changing the output device on which the cellular environment is being display (e.g. from a computer monitor to a projector). In one embodiment of the present invention described below, the method shown in FIG. 8A is implemented by client 302. Alternatively, this method can be implemented remotely from client 302, for example by content server 410.

An indication of a zoom state in a cellular environment can also be received 802 from an external event that triggers a change in the zoom state associated with a particular type of information, independently of any user input. For an exemplary cell or group of cells outputting financial information about a company, a triggering event such as a sudden change in the stock price can change the zoom state associated with the company, automatically zooming in to provide a user with additional information relevant to the company's stock price. An external event, for example a change in data, that triggers a change in zoom state can be detected by agent 604 or alternatively by client 302. Changing the zoom state in a cellular environment can also be based on a scheduled update initiated by scheduler 512. Delivery of updated content is explained in related U.S. patent application Ser. No. 11/281,043, entitled "Cellular User Interface," referenced above.

An indication of a zoom state in a cellular environment may also be received 802 by the client 302 determining a zoom state associated with a camera distance selected by a user. For example, a user may zoom to a particular camera distance on a continuum, and the method determines the zoom state by mapping the user's camera distance to a nearby zoom state.

Client 302 continues by determining 804 environment attributes associated with the cellular environment at the indicated zoom state. As explained above with reference to FIG. 2, environment attributes specify a geometric arrangement of cells in the cellular environment at the indicated zoom state. Environment attributes associated with the cellular environment can also be used to determine which cells arranged in the cellular environment are visible at the indicated zoom state. Further, each cell arranged in the cellular environment at the indicated zoom state has cell attributes 210 including geometric properties 213 such as a cell size and cell shape.

Upon determining 804 environment attributes for the cellular environment, client 302 determines 806 a content reference associated with each cell or group of cells arranged geometrically in the cellular environment at the indicated zoom state. According to one embodiment, a content reference associated with a zoom state for a cell or a group of cells is selected from a list of content references for various zoom states. As explained above with reference to Table A, each zoom state for a cell or a group of cells can be associated with a content reference. For example, if the zoom state indicated at step 802 is zoom state n in FIG. 2, the method selects the content reference for zoom state n. In this embodiment, the one or more content references are part of the zoom state definitions 212 associated with a metadata component 202 of a cell. For example, the cellular GUI is implemented in XML and the zoom state definitions 212 for a cell include one or more content references for different zoom states, wherein determining 806 the content reference comprises selecting one of the content references from zoom state definitions 212.

A content reference can also be determined 806 dynamically based on the cell attributes 210 associated with the one or more cells arranged geometrically in the cellular environment at the indicated zoom state. For example, the content reference can be determined dynamically based on content information 217, which specifies the type of content to be displayed via a cell or a group of cells. Alternatively, the content reference for a cell or a group of cells at a zoom state can be determined dynamically based on the content associated with the cell or group of cells. For example, a situational awareness control center application allows a Fire Chief to zoom in to a cell or a group of cells associated with various systems monitoring a fire incident, such as fire engine dispatch systems, local or national fire incident reporting systems (FIRS), police dispatch systems, 911 systems, as well as instrument monitoring systems (e.g., monitoring water supply in fire trucks). The content reference for each zoom state can be determined dynamically based on factors such as whether the fire is active or occurred in the past, or the duration or geographical area covered by the fire, for example as based on data in a cell associated with an FIRS. If the fire is still being extinguished (e.g. using status data from the fire engine dispatch system), the content reference at a particular zoom state may provide references to exemplary information such as live video of the fire scene or a radio channel for communicating with on-site personnel. If the fire occurred in the past (again, using data from the FIRS cell), the content reference at a particular zoom state may provide references to information such as injuries or property damage caused by the fire.

Upon receiving 802 an indication of a zoom state and determining 804 environment attributes, the method can determine the resolution of a cell arranged in the cellular environment at the zoom state. Next, client 302 can determine 806 a content reference that references the visual representation whose resolution is closest to the resolution of the cell available for output. Client 302 can also rescale an available visual representation to the resolution of the cell.

Client 302 continues by resolving 808 the content reference to obtain content. Resolving 808 a content reference comprises resolving one or more references included in a content reference. For example, a reference to a website that is accompanied by metadata (e.g. a URL string) is resolved to extract desired information from the website, which may include passing a query to a database or search engine at the website, making a call to an application server, or initiating a file transfer or other resource utilization. To provide another example, a reference to the path of a file on client 102 or on a network is resolved to obtain an image or data in the file.

A reference to cellular content to be outputted via one or more cells may be resolved by sending a fetch request to content server 410. The fetch request includes a reference to cellular content to be retrieved from cellular database 406 by content server 410. For example, the requested cellular content may be identified by specifying file names associated with the cellular content. To provide another example, the fetch request includes metadata specifying the type of cellular content to be retrieved and content server 410 searches cellular database 406 for content with the specified metadata. The content server 410 can be operated and configured via a remote content server console 414.

A content reference comprising a query is resolved by sending the query to content server 410. A query request sent from client 302 to content server 410 includes a logical expression specifying certain parameters or search criteria for the type of content to be retrieved from cellular database 406. Content server 410 executes the query by comparing the logical expression with metadata associated with content in cellular database 406, retrieves content that satisfies the search criteria, and returns the retrieved content to client 302. Referring to Table A, the content reference for zoom state n may comprise a query that retrieves the one or more visual representations 222n at zoom state n.

A content reference may also include a reference to a template to be retrieved from content server 410, which specifies a layout for the retrieved cellular content. To resolve 808 the content reference, content server 410 retrieves the desired template, assembles the retrieved cellular content according to the retrieved template and returns the populated template to client 302.

The content at one or more zoom states can be cached at client 302 or at a location accessible to the client through a network 315. For example, the content retrieved by a fetch or query request is cached at client 302 for easy retrieval in case the same fetch or query is repeated. Further, client 302 can also pre-fetch content from one or more zoom states to which the user is likely to navigate. By caching the retrieved content, client 302 is able to efficiently obtain and present the content, thereby improving response times for user navigation between various zoom states.

Content obtained at step 808 may include one or more visual representations 222. For example, a content reference at zoom state n is resolved to obtain one or more visual representations 222n associated with that zoom state. After resolving 808 the selected content reference to obtain content, the retrieved content is outputted 810 via a cell or a group of cells in accordance with their cell attributes 210. Outputting 810 content comprises outputting visual representations 222 associated with a zoom state via cells in the cellular GUI. Retrieved content may also be outputted in a non-cellular GUI, for example in a separate window outside of the cellular GUI and containing the native interface of a particular application, such as a spreadsheet, word processor or database. Outputting 810 content may also include outputting non-visual information such as audio associated with a cell at the indicated zoom state. Further, outputting 810 content can include outputting content retrieved from an information object by invoking a native application capable of interacting with the retrieved content, and displaying that native application's window within a cell.

Content outputted 810 at a zoom state helps a user choose how to make further navigation decisions. The visual representations outputted at a zoom state may include content in different areas of interest, different subject matter, different applications or different media types. For example, upon zooming in to a zoom state providing information on recreational activities at a holiday resort, the user is presented in one cell with a multi-media presentation of available outdoor activities at the resort, a video in another cell of attractions at a theme park, photographs in another cell from a scenic hike, and information about indoor recreational activities in a yet another cell. These cells provide the user with information about recreational activities, and they also help the user choose how to zoom in to obtain additional information at further zoom states. For example, the user may choose to obtain additional information about the theme park in different media types by zooming in to the cell showing the video. Alternatively, the user may focus on a particular subject matter by zooming in to the cell associated with indoor activities.

Figure 8B:
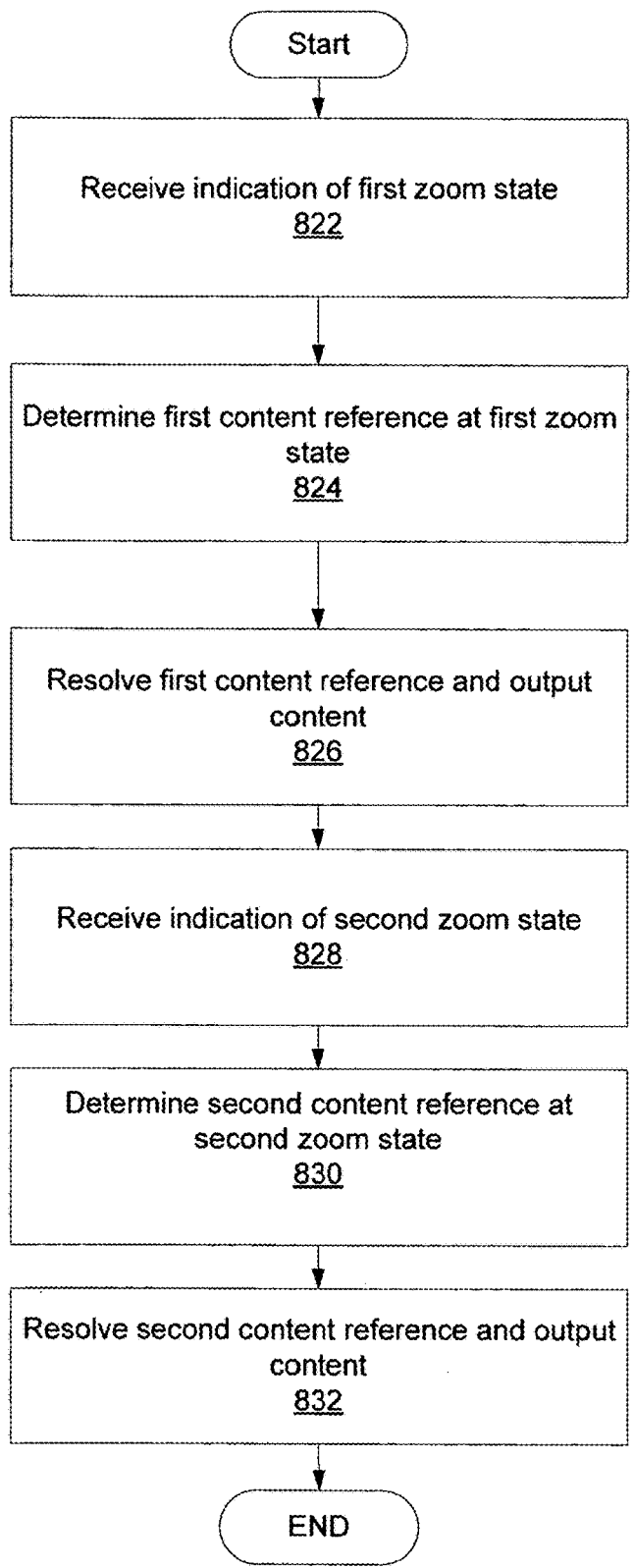
FIG. 8B is a flowchart of a method for navigating more than one zoom states for a cellular environment according to one embodiment.

A second zoom state can be associated with one or more cells displayed at a first zoom state. As discussed above, a user zooms in to a first zoom state to obtain content, including one or more visual representations, associated with the first zoom state. The user may further zoom in to obtain content associated with a second zoom state for the one or more cells. FIG. 8B is a flowchart of a method for navigating more than one zoom states for a cellular environment. Upon receiving 822 an indication of a first zoom state, the method determines 824 a first content reference for a cell or a group of cells to be outputted at the first zoom state. The first content reference is resolved 826 to retrieve and output the first content via the cell or group of cells, wherein the first content includes a first visual representation. Upon receiving 828 an indication of a second zoom state, the method determines 830 a second content reference for the cell or group of cells at the second zoom state, and resolves 832 the second content reference to retrieve and output a second content via the cell or group of cells, wherein the second content includes a second visual representation.

Note that the content at one or more zoom states may be tailored for output via different devices, applications, operating systems or processors. According to one embodiment, this may be achieved by a layer of software that tailors content to different devices, applications, operating systems or processors, such as a PDA, a PC, a cell phone, computer monitor, television monitor (including HD monitors or televisions), a web browser, or a fast Scalable Vector Graphics (SVG) viewer. For example, to output content via a web browser, content server 410 converts content and visual representations to HTML and JavaScript. To provide another example, content can be rendered using a processor that does not support floating point operations by using a 3D library that uses only fixed point operations.

Content in a cell may be outputted at varying levels of content quality for images, video, audio or other media types outputted via a cell. Cells on which a user is focused can be displayed at a higher frame rate or resolution to provide better content image quality. Other cells in the view may be displayed at a lower frame rate to save resources such as processing power. For example, when a user moves his mouse over a cell, content in the cell is displayed at a high frame rate. To provide another example, when a user zooms in to an inner zoom state associated with a cell, the retrieved content at the inner zoom state is displayed at a higher frame rate. Alternatively, instead of changes in frame rate, the bitrate of audio or video can be controlled to adjust its quality. The change in zoom state can be used to control the operations of an image or video decoder, such as an MPEG-4 compatible video decoder, to selectively activate higher or lower performance decoding options, which in turn results in higher or lower image or video quality.

Different Visual Representations at Different Zoom States

One embodiment of the present invention uses different visual representations for displaying information at different zoom states. For example, an image at one zoom state presents a user with a cell displaying a visual representation of a small logo of a company. At a next zoom state, the cell displays a different and larger image of the company's name and stock price. At a still further zoom state, the cell displays yet another different and even larger image showing a graph of the company's stock performance, the chart computed from a database of stock prices, and then provided to a graphing application. To provide another example of different visual representations at different zoom states, a cell can display successively larger images of a multimedia presentation, starting with a title at a first zoom state, the title of each slide at the next zoom state, and the actual content of each slide at the third zoom state.

Visual representations at different zoom states represent content derived from one or more information objects. Further, the visual representations at different zoom states may have different resolutions and/or different dimensions. Note that these visual representations may be at least partially pre-generated to save processing time during user navigation. Pre-generated visual representations are stored in one or more image files that are cached at client 302 (or at any accessible network location) for quick access or retrieved from content server 410 prior to output. Alternatively, visual representations at different zoom states may be generated dynamically based on content derived from one or more information objects.

Different visual representations at different zoom states can be navigated within a cellular GUI. Referring to FIG. 2, a cellular GUI provides different images as the visual representations 222 at one or more zoom states. For example, visual representations 222a and 222b at zoom state 1 and zoom state 2 comprise different images associated with a cell, where each image may have a different resolution. The content references at these zoom states include references to the different images. The different images at different zoom states can be generated independently. Further, the different images at different zoom states can be mutually non-derivable, not being derived from a common underlying image. For example, image 222a at zoom state 1 is not merely a different resolution version of image 222b at zoom state 2, but image 222a can also include different content than image 222b. Further, the content at different zoom states may occur in different media types such as an image, text, a graph, or video. Moreover, the content at different zoom states may be accessible via different applications.

One skilled in the art will recognize that different visual representations can also be outputted at different zoom states independently of cells. For example, in flight simulation software, different visual representations of a naval carrier may be outputted as an aircraft approaches the naval carrier for landing, where a first visual representation shows the runway clear of obstacles, while a second visual representation shows an explosion on the runway that requires landing procedures to be terminated. The first and second visual representations can be pre-generated and stored to save processing time while outputting the visual representations.

Visual representations can provide different images or textures that may be applied to a graphic at different zoom states. Visual representations used as images or textures preferably have resolutions that are powers of two. For example, different images at successive zoom states may have the following resolutions: 1024×512 pixels, 512×256 pixels, 256×128 pixels, 128×64 pixels and so on. The different images at successive zoom states can be generated independently and can be mutually non-derivable, not being derived from a common underlying image. By using different visual representations for displaying images or textures at different zoom states, one embodiment of the present invention uses the optimizations provided by conventional mipmapping techniques to display different visual representations at varying zoom states. Therefore, a graphic need not be confined to a single image at different resolutions as in conventional mipmaps.

A further embodiment of the present invention advantageously exploits 3D graphics hardware capabilities of conventional video cards to display different images or textures at different zoom states. Using a 3D graphics driver with hardware that supports mipmapped textures, which image is displayed can be changed based on the screen resolution available for displaying the image. For example, graphic driver software (e.g. DirectX) can be used to access mipmap functionalities of video card. Further, hardware texture decompression can be used to reduce the size of textures.

Content Update Mechanisms

According to one embodiment, content outputted via cells is updated based on changes in an underlying data source, for example cellular database 406, by means of live cell mechanisms that are explained in related U.S. patent application Ser. No. 11/281,043, entitled "Cellular User Interface," referenced above. According to another embodiment, content outputted via cells is updated dynamically in response to receiving an indication of a content event. An indication of a content event may be received, for example, via RSS feeds. Content events are described in more detail in related U.S. patent application Ser. No. 11/281,043, entitled "Cellular User Interface," referenced above. A content event is capable of dynamically changing a zoom state associated with one or more cells or of dynamically changing content accessible via one or more cells. For example, a sudden change in a company's stock price may cause client application 304 to zoom in to a group of cells providing the latest news about the company. Alternatively, a content event may dynamically change a content reference associated with a cell or a group of cells, and trigger client 302 to re-resolve the changed content reference and output the retrieved content. Content outputted via cells can also be updated based on scheduled data updates, which are explained in related U.S. patent application Ser. No. 11/281, 043, entitled "Cellular User Interface," referenced above.

Additional Mechanisms for Changing Cell Content

Content outputted via a cell can change even without navigating a cell, i.e. without panning or zooming. Even if the zoom state and orientation of a cellular environment is constant, content outputted via a cell arranged geometrically in the cellular environment can change in response to changing the shape or size of the cell, the display device, or the layout of the cellular environment.

Content outputted via a cell can change in response to changing a cell attribute such as the size or shape or the cell. The size and shape of a cell can be changed in response to content updates such as live cell updates, scheduled data updates and live cell mechanisms. For example, a live cell update can change the amount of content available for output via a cell. Referring to FIG. 2, zoom state definitions 212 for a cell can provide different content references associated with different sizes and shapes for the cell. For example, the shape of a cell can be changed by changing its aspect ratio from 1:1, which represents the cell as a square, to 3:4, which represents the cell as a rectangle. In response to a change in cell's size or shape, a viewer application can determine a content reference associated with the cell's updated size or shape. Further, the viewer application can resolve the content reference to retrieve updated content for the cell, and output the updated content via the cell.

Content outputted via a cell can also change in response to changing the display device in which the cellular environment is displayed. Different display devices can have different pixel resolutions or screen dimensions. Even without changing the zoom state of a cell, the cell can be displayed at different resolutions, shapes or sizes on different display devices. Referring to FIG. 2, zoom state definitions 212 for a cell can provide different content references associated with the cell for different display devices. When a cell is outputted via a particular display device, a viewer application can determine a content reference associated with the cell for that display device. Further, the viewer application can resolve the content reference to retrieve updated content for the cell, and output the updated content via the cell.

Content outputted via a cell can change in response to changing the layout of the cellular environment. Layouts may be defined in the cellularized environment definition or otherwise programmed in association with a cellularized environment or world. The layouts may specify a view into the world, e.g., a different face of a cube, a section of a sphere, a region of a dashboard, or the like. Layouts may also specify a zoom level for the cells being displayed, cell locations, default values for cells, and the like. Further, the ability to dynamically transition between geometries and algorithmically vary the cell display location, shape, size, orientation, and the like with respect to each individual cell or groups of cells alike enables the dynamic generation of motion within the cellularized environment. When the layout of a cellular environment changes, e.g. in response to a new layout algorithm received by a viewer application, the viewer application can determine an updated content reference associated with a cell whose size, shape, location, etc. has changed based on changed layout. Further, the viewer application can resolve the updated content reference to retrieve updated content for the cell, and output the updated content via the cell arranged in the new layout.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

Note that the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magneto-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The invention claimed is:

1. A method comprising:
receiving, by a server computer from a client device, an indication that a graphical user interface (GUI) on the client device is at a first zoom state associated with a cellular environment, the cellular environment configured for providing a spatial arrangement or spatial configuration of a plurality of category cells in a two-dimensional or three-dimensional space on the GUI, the plurality of category cells representing various categories of information;
for each category cell of the plurality of category cells, resolving a content reference associated with the each category cell and the first zoom state, the resolving performed by the server computer and comprising:
  querying a data source to identify a category name for the each category cell; and
  obtaining a snapshot of one of a plurality of web pages associated with the category name;
displaying the plurality of category cells in the GUI on the client device;
receiving a user interaction with a first one of the category cells, the user interaction changing the zoom state of the GUI from the first zoom state to a second zoom state;
responsive to the user interaction with the first one of the category cells, determining a subset of bookmark cells to display in the GUI at the second zoom state;
for each bookmark cell in the subset of bookmark cells, resolving a content reference associated with the each bookmark cell and the second zoom state, the resolving comprising:
  querying, using the content reference associated with the each bookmark cell, a uniform resource locator (URL) to obtain content for a web page;
  responsive to the user interaction with the first one of the category cells, displaying the subset of bookmark cells with the content obtained using the URL in the GUI such that the subset of bookmark cells displayed in the GUI at the second zoom state present various types of contents relative to the first one of the category cells; and
  converting the various types of contents to a common format prior to displaying the subset of bookmark cells in the GUI at the second zoom state.

2. The method of claim 1, wherein the content references associated with the category cells at the first zoom state are different from the content references associated with bookmark cells at the second zoom state.

3. The method of claim 1, wherein displaying one of the category cells in the GUI comprises displaying the snapshot obtained for that category cell.

4. The method of claim 1, further comprising:
receiving a search query;
identifying a subset of the category cells that match the search query; and
wherein displaying the plurality of category cells comprises displaying the subset of category cells that match the search query.

5. The method of claim 1, further comprising:
receiving a search query; and
identifying a second subset of the bookmark cells that match the search query; and
displaying the second subset of bookmark cells that match the search query.

6. The method of claim 1, wherein bookmark cells are associated with individual category cells, and wherein determining the subset of bookmark cells to display at the second zoom state comprises identifying the bookmark cells associated with the first one of the category cells that received the user interaction.

7. The method of claim 6, wherein the content reference associated with the each category cell comprises a template specifying an arrangement for visual representation of the bookmark cells that are associated with the each category cell; and
wherein displaying the subset of bookmark cells in the GUI comprises configuring the visual representation of the bookmark cells based on the arrangement of the template.

8. The method of claim 1, wherein each of the displayed bookmark cells in the GUI is arranged in a geometric arrangement with respect to the other displayed bookmark cells in the subset of bookmark cells.

9. The method of claim 1, further comprising:
receiving a pan interaction with the GUI; and
responsive to the pan interaction, displaying a different set of category or bookmark cells in the GUI, the displayed different cells being horizontally arranged with respect to a geometric arrangement of previously displayed cells.

10. A method comprising:
providing, by a server computer, a graphical user interface (GUI) at a first zoom state associated with a cellular environment, the cellular environment configured for providing a spatial arrangement or spatial configuration of a plurality of category cells in a two-dimensional or three-dimensional space on the GUI, the plurality of category cells representing various categories of information, the GUI comprising the plurality of category cells, each category cell in the plurality of category cells configured to resolve a content reference associated with the each category cell and the first zoom state, the resolving comprising:
  querying, by a client device, a data source to identify a category name for the each category cell;
  obtaining, by the client device, a snapshot of one of a plurality of web pages associated with the category name;
displaying the plurality of category cells in the GUI on the client device;
receiving, by the server computer, an indication of a user interaction with a first one of the category cells provided to the client device, the user interaction changing the zoom state of the GUI from the first zoom state to a second zoom state;
responsive to the user interaction, providing a subset of bookmark cells from the server computer to the client device to display in the GUI on the client device at the second zoom state, each bookmark cell in the subset of bookmark cells configured to resolve a content reference associated with the each bookmark cell and the second zoom state, the resolving comprising:

querying, by the client device and using the content reference associated with the each bookmark cell, a uniform resource locator (URL) to obtain content for a web page; and responsive to the user interaction with the first one of the category cells, displaying the subset of bookmark cells with the content obtained using the URL in the GUI on the client device such that the subset of bookmark cells displayed in the GUI at the second zoom state present various types of contents relative to the first one of the category cells; and converting the various types of contents to a common format prior to displaying the subset of bookmark cells in the GUI at the second zoom state.

11. The method of claim 10, wherein the content references associated with the category cells at the first zoom state are different from the content references associated with bookmark cells at the second zoom state.

12. The method of claim 10, wherein displaying one of the category cells in the GUI on the client device comprises displaying the snapshot obtained for that category cell.

13. The method of claim 10, further comprising:
receiving a search query at the server computer from the client device;
identifying a subset of the category cells that match the search query;
providing the subset of the category cells to the client device; and
wherein displaying the plurality of category cells at the client device comprises displaying the subset of category cells that match the search query.

14. The method of claim 10, further comprising:
receiving a search query at the server computer from the client device; and
identifying a second subset of the bookmark cells that match the search query;
providing the subset of the category cells to the client device; and
displaying the second subset of bookmark cells that match the search query.

15. The method of claim 10, wherein bookmark cells are associated with individual category cells, and wherein determining the subset of bookmark cells to provide to the client device comprises identifying the bookmark cells associated with the first one of the category cells that received the user interaction.

16. The method of claim 15, wherein the content reference associated with the each category cell comprises a template specifying an arrangement for visual representation of the bookmark cells that are associated with the each category cell; and
wherein displaying the subset of bookmark cells in the GUI at the client device comprises configuring the visual representation of the bookmark cells based on the arrangement of the template.

17. The method of claim 10, wherein each of the displayed bookmark cells in the GUI on the client device is arranged in a geometric arrangement with respect to the other displayed bookmark cells in the subset of bookmark cells.

18. The method of claim 10, further comprising:
receiving a pan interaction with the GUI at the server computer from the client device; and
providing a different set of category or bookmark cells from the server computer to the client device, the displayed different cells being horizontally arranged with respect to a geometric arrangement of previously displayed cells.

19. A method comprising:
for each of a plurality web page cells, resolving, by a server computer, a content reference associated with the web page cell associated with a cellular environment, the cellular environment configured for providing a spatial arrangement or spatial configuration of a plurality of category cells in a two-dimensional or three-dimensional space on a graphical user interface (GUI) of a client device, the plurality of category cells representing various categories of information, the resolving comprising:
querying a uniform resource locator (URL) to obtain an image of a web page located at the URL;
displaying a subset of the web page cells in the GUI on the client device, each of the displayed cells in the subset arranged in a geometric arrangement with respect to the other displayed cells in subset;
receiving a pan interaction with a first one of the category cells in the GUI on the client device;
responsive to the pan interaction, displaying a different subset of the web page cells in the GUI on the client device, the different cells being horizontally arranged with respect to a geometric arrangement of previously displayed cells in the subset;
receiving a user interaction with a selected one of the displayed web page cells in the GUI on the client device;
responsive to the user interaction with the selected on of the displayed web page cells in the GUI on the client device, querying the uniform resource locator (URL) for the selected cell to obtain additional content for the web page;
displaying the different subset of web page cells in the GUI on the client device such that the different subset of web page cells displayed in the GUI present various types of contents relative to the first one of the category cells; and
converting the various types of contents to a common format prior to displaying the different subset of web page cells in the GUI.

20. The method of claim 19, wherein each of the web page cells is associated with a date value indicative of a date when the web page was last visited,
wherein the geometric arrangement of the displayed cells in the subset is based sequentially on associated date values.

* * * * *